United States Patent

(12) United States Patent
Frank et al.

(10) Patent No.: US 9,517,679 B2
(45) Date of Patent: Dec. 13, 2016

(54) SYSTEMS AND METHODS FOR MONITORING VEHICLE OCCUPANTS

(71) Applicant: FLIR Systems, Inc., Wilsonville, OR (US)

(72) Inventors: Jeffrey D. Frank, Santa Barbara, CA (US); Austin A. Richards, Santa Barbara, CA (US); Victoria L. White, Santa Barbara, CA (US); Nile E. Fairfield, Goleta, CA (US); Arthur Stout, Goleta, CA (US); David W. Lee, Portland, OR (US); Nicholas Högasten, Santa Barbara, CA (US); Theodore R. Hoelter, Goleta, CA (US); Katrin Strandemar, Rimbo (SE)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 14/097,197

(22) Filed: Dec. 4, 2013

(65) Prior Publication Data

US 2014/0093133 A1 Apr. 3, 2014

Related U.S. Application Data

(63) Continuation of application No. 13/902,177, filed on May 24, 2011, now abandoned, and a
(Continued)

(51) Int. Cl.
*G06K 9/00* (2006.01)
*B60H 1/00* (2006.01)
(Continued)

(52) U.S. Cl.
CPC ......... *B60H 1/00742* (2013.01); *B60R 21/015* (2013.01); *B60R 21/0154* (2014.10);
(Continued)

(58) Field of Classification Search
CPC ...... H04N 5/2257; H04N 5/33; H04N 5/3658; H04N 5/32; B60H 1/00742; B60R 21/015; B60R 21/01532; B60R 21/0154; G06K 9/00362; G06K 9/00832
(Continued)

(56) References Cited

U.S. PATENT DOCUMENTS 2,764,055 A 9/1956 Clemens et al.
5,071,160 A * 12/1991 White ................... B60R 21/02
180/268

(Continued)

FOREIGN PATENT DOCUMENTS

CA 2764055 7/2012
CN 2874947 2/2007
(Continued)

OTHER PUBLICATIONS

Darpa, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.

*Primary Examiner* — Shan Elahi
(74) *Attorney, Agent, or Firm* — Haynes and Boone, LLP

(57) ABSTRACT

Techniques are disclosed for systems and methods using small form factor infrared imaging modules to monitor occupants in an interior compartment of a vehicle. For example, a vehicle-mounted system may include one or more infrared imaging modules, a processor, a memory, alarm sirens, and a communication module. The vehicle-mounted system may be mounted on, installed in, or otherwise integrated into a vehicle with an interior compartment. The infrared imaging modules may be configured to capture thermal images of desired portions of the interior compartments. Various thermal image processing and analytics may be performed on the captured thermal images to determine the presence and various attributes of one or more occu- (Continued)

pants. Based on the determination of the presence and various attributes, occupant detection information or control signals may be generated. Occupant detection information may be used to perform various monitoring operations, and control signals may adjust various vehicle components.

20 Claims, 15 Drawing Sheets

Related U.S. Application Data continuation-in-part of application No. PCT/US2012/041744, filed on Jun. 8, 2012, and a continuation-in-part of application No. PCT/US2012/041749, filed on Jun. 8, 2012, and a continuation-in-part of application No. PCT/US2012/041739, filed on Jun. 8, 2012, and a continuation-in-part of application No. 13/622,178, filed on Sep. 18, 2012, now Pat. No. 9,237,284, which is a continuation-in-part of application No. 13/529,772, filed on Jun. 21, 2012, now Pat. No. 8,780,208, which is a continuation of application No. 12/396,340, filed on Mar. 2, 2009, now Pat. No. 8,208,026.

(60) Provisional application No. 61/652,030, filed on May 25, 2012, provisional application No. 61/656,889, filed on Jun. 7, 2012, provisional application No. 61/545,056, filed on Oct. 7, 2011, provisional application No. 61/495,873, filed on Jun. 10, 2011, provisional application No. 61/495,879, filed on Jun. 10, 2011, provisional application No. 61/495,888, filed on Jun. 10, 2011.

(51) Int. Cl.
*H04N 5/32* (2006.01)
*H04N 5/33* (2006.01)
*H04N 5/365* (2011.01)
*B60R 21/015* (2006.01)
*H04N 5/225* (2006.01)

(52) U.S. Cl.
CPC .... *B60R 21/01532* (2014.10); *G06K 9/00362* (2013.01); *G06K 9/00832* (2013.01); *H04N 5/2257* (2013.01); *H04N 5/32* (2013.01); *H04N 5/33* (2013.01); *H04N 5/3658* (2013.01)

(58) Field of Classification Search
USPC ........................................................ 348/148
See application file for complete search history.

(56) References Cited

U.S. PATENT DOCUMENTS

| | | | |
|---|---|---|---|
| 5,689,241 A * | 11/1997 | Clarke et al. ................. 340/575 |
| 5,959,589 A * | 9/1999 | Sadovnik et al. ............ 343/765 |
| 6,348,951 B1 | 2/2002 | Kim | |
| 6,370,260 B1 * | 4/2002 | Pavlidis ............. G06K 9/00228 348/169 |
| 6,396,543 B1 | 5/2002 | Shin et al. | |
| 6,400,835 B1 * | 6/2002 | Lemelson ............ B60Q 1/0023 307/10.5 |
| 6,424,843 B1 | 7/2002 | Reitmaa et al. | |
| 6,517,107 B2 * | 2/2003 | Johnson ............ B60R 21/01526 280/735 |
| 6,633,231 B1 | 10/2003 | Okamoto et al. | |
| 6,681,120 B1 | 1/2004 | Kim | |
| 6,718,049 B2 * | 4/2004 | Pavlidis ............. G06K 9/00228 348/164 |
| 6,724,920 B1 * | 4/2004 | Berenz ................ G06K 9/00221 180/169 |
| 6,759,949 B2 | 7/2004 | Miyahara | |
| 6,829,370 B1 * | 12/2004 | Pavlidis ............. G06K 9/00228 348/169 |
| 6,831,993 B2 * | 12/2004 | Lemelson ............ B60Q 1/0023 307/10.5 |
| 6,883,054 B2 | 4/2005 | Yamaguchi et al. | |
| 6,911,652 B2 | 6/2005 | Walkenstein | |
| 6,940,400 B2 * | 9/2005 | Pelletier ................. B60N 2/002 340/425.5 |
| 7,027,621 B1 * | 4/2006 | Prokoski ........................ 382/118 |
| 7,050,107 B1 | 5/2006 | Frank et al. | |
| D524,785 S | 7/2006 | Huang | |
| 7,076,088 B2 * | 7/2006 | Pavlidis ............. G06K 9/00228 348/164 |
| 7,084,857 B2 | 8/2006 | Lieberman et al. | |
| 7,208,733 B2 | 4/2007 | Mian et al. | |
| 7,220,966 B2 * | 5/2007 | Saito et al. ................. 250/341.6 |
| 7,263,379 B1 | 8/2007 | Parkulo et al. | |
| 7,284,921 B2 | 10/2007 | Lapstun et al. | |
| 7,296,747 B2 | 11/2007 | Rohs | |
| 7,305,368 B2 | 12/2007 | Lieberman et al. | |
| 7,321,783 B2 | 1/2008 | Kim | |
| 7,333,832 B2 | 2/2008 | Tsai et al. | |
| 7,348,880 B2 * | 3/2008 | Hules .................. B60R 25/1004 340/425.5 |
| 7,377,835 B2 | 5/2008 | Parkulo et al. | |
| 7,420,663 B2 | 9/2008 | Wang et al. | |
| 7,427,758 B2 * | 9/2008 | Garman ..................... G01J 5/06 250/338.1 |
| 7,453,064 B2 | 11/2008 | Lee | |
| 7,477,309 B2 | 1/2009 | Cuccias | |
| 7,567,818 B2 | 7/2009 | Pylkko | |
| 7,572,077 B2 | 8/2009 | Lapstun et al. | |
| 7,575,077 B2 | 8/2009 | Priepke et al. | |
| 7,595,904 B2 | 9/2009 | Lapstun et al. | |
| 7,627,364 B2 | 12/2009 | Sato | |
| 7,697,962 B2 | 4/2010 | Cradick et al. | |
| 7,723,686 B2 | 5/2010 | Hannebauer | |
| 7,725,141 B2 | 5/2010 | Su | |
| 7,728,281 B2 | 6/2010 | Chen | |
| 7,735,974 B2 | 6/2010 | Silverbrook et al. | |
| 7,747,454 B2 | 6/2010 | Bartfeld et al. | |
| 7,760,919 B2 | 7/2010 | Namgoong | |
| 7,761,114 B2 | 7/2010 | Silverbrook et al. | |
| 7,773,870 B2 | 8/2010 | Naruse | |
| 7,801,733 B2 | 9/2010 | Lee et al. | |
| 7,810,733 B2 | 10/2010 | Silverbrook et al. | |
| 7,872,574 B2 | 1/2011 | Betts et al. | |
| 7,900,842 B2 | 3/2011 | Silverbrook et al. | |
| 7,903,152 B2 | 3/2011 | Kim | |
| 7,947,222 B2 | 5/2011 | Bae et al. | |
| 7,960,700 B2 | 6/2011 | Craig et al. | |
| 8,089,340 B2 * | 1/2012 | Cochran et al. ................ 340/5.7 |
| 8,275,413 B1 | 9/2012 | Fraden et al. | |
| 8,305,577 B2 | 11/2012 | Kivioja et al. | |
| 8,345,226 B2 | 1/2013 | Zhang | |
| 8,537,343 B2 | 9/2013 | Zhang | |
| 8,781,420 B2 | 7/2014 | Schlub et al. | |
| 8,825,112 B1 | 9/2014 | Fraden et al. | |
| 8,836,491 B2 * | 9/2014 | Rao ........................ B60K 28/08 340/426.13 |
| 8,872,111 B2 * | 10/2014 | Burkland ..................... 250/338.1 |
| 2002/0006337 A1 | 1/2002 | Kimura et al. | |
| 2002/0044674 A1 * | 4/2002 | Pavlidis ......................... 382/118 |
| 2002/0122036 A1 | 9/2002 | Sasaki | |
| 2002/0135571 A1 | 9/2002 | Klocek et al. | |
| 2002/0140542 A1 | 10/2002 | Prokoski et al. | |
| 2002/0149600 A1 | 10/2002 | Van Splunter et al. | |
| 2002/0151817 A1 * | 10/2002 | Gentempo et al. ............ 600/549 |
| 2002/0196131 A1 * | 12/2002 | McCarthy et al. ........ 340/425.5 |
| 2003/0007193 A1 | 1/2003 | Sato et al. | |
| 2003/0025793 A1 * | 2/2003 | McMahon ..................... 348/148 |
| 2003/0112871 A1 | 6/2003 | Demos | |
| 2003/0122957 A1 | 7/2003 | Emme | |
| 2003/0223623 A1 | 12/2003 | Gutta et al. | |
| 2004/0047518 A1 | 3/2004 | Tiana | |
| 2004/0101298 A1 | 5/2004 | Mandelbaum et al. | |
| 2004/0127156 A1 | 7/2004 | Park | |
| 2004/0128070 A1 | 7/2004 | Schmidt et al. | |

(56) References Cited

U.S. PATENT DOCUMENTS

| | | |
|---|---|---|
| 2004/0148057 A1* | 7/2004 | Breed et al. ................. 700/242 |
| 2004/0157612 A1 | 8/2004 | Kim |
| 2004/0165788 A1 | 8/2004 | Perez et al. |
| 2004/0169860 A1 | 9/2004 | Jung et al. |
| 2004/0207036 A1 | 10/2004 | Ikeda |
| 2004/0256561 A1 | 12/2004 | Beuhler et al. |
| 2005/0030314 A1 | 2/2005 | Dawson |
| 2005/0046584 A1* | 3/2005 | Breed .................... 340/825.72 |
| 2005/0067852 A1* | 3/2005 | Jeong |
| 2005/0068333 A1 | 3/2005 | Nakahashi et al. |
| 2005/0089241 A1 | 4/2005 | Kawanishi et al. |
| 2005/0093890 A1 | 5/2005 | Baudisch |
| 2005/0110803 A1 | 5/2005 | Sugimura |
| 2005/0138569 A1 | 6/2005 | Baxter et al. |
| 2005/0169655 A1 | 8/2005 | Koyama et al. |
| 2005/0184993 A1 | 8/2005 | Ludwin et al. |
| 2005/0186327 A1* | 8/2005 | Saito et al. ........................ 427/8 |
| 2005/0195383 A1* | 9/2005 | Breed et al. ................. 356/4.01 |
| 2005/0213813 A1 | 9/2005 | Lin et al. |
| 2005/0213853 A1 | 9/2005 | Maier et al. |
| 2005/0219249 A1 | 10/2005 | Xie et al. |
| 2005/0248912 A1 | 11/2005 | Kang et al. |
| 2005/0265688 A1 | 12/2005 | Kobayashi |
| 2005/0270784 A1 | 12/2005 | Hahn et al. |
| 2005/0277447 A1 | 12/2005 | Buil et al. |
| 2006/0006988 A1* | 1/2006 | Harter et al. ................. 340/435 |
| 2006/0039686 A1 | 2/2006 | Soh et al. |
| 2006/0044727 A1* | 3/2006 | Aboyade et al. ............. 361/103 |
| 2006/0060984 A1 | 3/2006 | Wakabayashi et al. |
| 2006/0077246 A1 | 4/2006 | Kawakami et al. |
| 2006/0097172 A1 | 5/2006 | Park |
| 2006/0102843 A1* | 5/2006 | Bazakos et al. ......... 250/339.05 |
| 2006/0104488 A1* | 5/2006 | Bazakos et al. ............. 382/118 |
| 2006/0120712 A1 | 6/2006 | Kim |
| 2006/0132642 A1 | 6/2006 | Hosaka et al. |
| 2006/0140501 A1 | 6/2006 | Tadas |
| 2006/0147191 A1 | 7/2006 | Kim |
| 2006/0154559 A1 | 7/2006 | Yoshida |
| 2006/0208169 A1* | 9/2006 | Breed et al. ................. 250/221 |
| 2006/0210249 A1 | 9/2006 | Seto |
| 2006/0212194 A1* | 9/2006 | Breed ............................ 701/29 |
| 2006/0217864 A1* | 9/2006 | Johnson et al. ............... 701/45 |
| 2006/0232675 A1* | 10/2006 | Chamberlain et al. ....... 348/164 |
| 2006/0234744 A1 | 10/2006 | Sung et al. |
| 2006/0240867 A1 | 10/2006 | Wang et al. |
| 2006/0251293 A1* | 11/2006 | Piirainen et al. ............. 382/104 |
| 2006/0255275 A1* | 11/2006 | Garman .................... G01J 5/06 250/338.1 |
| 2006/0279758 A1 | 12/2006 | Myoki |
| 2006/0284839 A1* | 12/2006 | Breed et al. ................. 345/156 |
| 2006/0285907 A1 | 12/2006 | Kang et al. |
| 2007/0004449 A1 | 1/2007 | Sham |
| 2007/0019077 A1 | 1/2007 | Park |
| 2007/0019099 A1 | 1/2007 | Lieberman et al. |
| 2007/0019103 A1 | 1/2007 | Lieberman et al. |
| 2007/0025597 A1* | 2/2007 | Breed et al. ................. 382/104 |
| 2007/0033309 A1 | 2/2007 | Kuwabara et al. |
| 2007/0034800 A1 | 2/2007 | Huang |
| 2007/0052616 A1 | 3/2007 | Yoon |
| 2007/0057764 A1 | 3/2007 | Sato et al. |
| 2007/0085697 A1* | 4/2007 | Breed .................... 340/825.72 |
| 2007/0086624 A1* | 4/2007 | Breed et al. ................. 382/104 |
| 2007/0103479 A1 | 5/2007 | Kim et al. |
| 2007/0120879 A1 | 5/2007 | Kanade et al. |
| 2007/0132858 A1 | 6/2007 | Chiba et al. |
| 2007/0139739 A1 | 6/2007 | Kim et al. |
| 2007/0159524 A1 | 7/2007 | Kim et al. |
| 2007/0182528 A1* | 8/2007 | Breed et al. ................. 340/435 |
| 2007/0189583 A1 | 8/2007 | Shimada et al. |
| 2007/0211965 A1 | 9/2007 | Helbing et al. |
| 2007/0222798 A1 | 9/2007 | Kuno |
| 2007/0247517 A1* | 10/2007 | Zhang et al. .................. 348/30 |
| 2007/0248284 A1 | 10/2007 | Bernsen et al. |
| 2007/0262574 A1* | 11/2007 | Breed et al. ................. 280/735 |
| 2007/0274541 A1 | 11/2007 | Uetake et al. |
| 2007/0285439 A1 | 12/2007 | King et al. |
| 2007/0286517 A1 | 12/2007 | Paik et al. |
| 2007/0293188 A1* | 12/2007 | Houghton et al. ......... 455/404.2 |
| 2007/0299226 A1 | 12/2007 | Park et al. |
| 2008/0038579 A1 | 2/2008 | Schuisky et al. |
| 2008/0040004 A1* | 2/2008 | Breed ............................ 701/45 |
| 2008/0046149 A1* | 2/2008 | Breed ............................ 701/45 |
| 2008/0046150 A1* | 2/2008 | Breed ............................ 701/45 |
| 2008/0056612 A1 | 3/2008 | Park et al. |
| 2008/0079834 A1 | 4/2008 | Chung et al. |
| 2008/0112012 A1 | 5/2008 | Yokoyama et al. |
| 2008/0125941 A1* | 5/2008 | Mitteer ............. B60H 1/00742 701/46 |
| 2008/0142713 A1* | 6/2008 | Breed ................... B60N 2/002 250/330 |
| 2008/0151056 A1 | 6/2008 | Ahamefula |
| 2008/0165190 A1 | 7/2008 | Min et al. |
| 2008/0165342 A1 | 7/2008 | Yoshida et al. |
| 2008/0170082 A1 | 7/2008 | Kim |
| 2008/0218474 A1 | 9/2008 | Ahn et al. |
| 2008/0248833 A1 | 10/2008 | Silverbrook et al. |
| 2008/0266079 A1 | 10/2008 | Lontka |
| 2008/0278772 A1 | 11/2008 | Silverbrook et al. |
| 2008/0284880 A1 | 11/2008 | Numata |
| 2008/0292144 A1 | 11/2008 | Kim |
| 2008/0297614 A1 | 12/2008 | Lieberman et al. |
| 2009/0023421 A1 | 1/2009 | Parkulo et al. |
| 2009/0027525 A1 | 1/2009 | Lin et al. |
| 2009/0040042 A1 | 2/2009 | Lontka |
| 2009/0040195 A1 | 2/2009 | Njolstad et al. |
| 2009/0052883 A1 | 2/2009 | Lee et al. |
| 2009/0129700 A1 | 5/2009 | Rother et al. |
| 2009/0131104 A1 | 5/2009 | Yoon |
| 2009/0148019 A1 | 6/2009 | Hamada et al. |
| 2009/0213110 A1 | 8/2009 | Kato et al. |
| 2009/0215479 A1 | 8/2009 | Karmarkar |
| 2009/0227287 A1 | 9/2009 | Kotidis |
| 2009/0238238 A1 | 9/2009 | Hollander et al. |
| 2009/0278048 A1 | 11/2009 | Choe et al. |
| 2009/0297062 A1 | 12/2009 | Molne et al. |
| 2010/0066866 A1 | 3/2010 | Lim |
| 2010/0090965 A1 | 4/2010 | Birkler |
| 2010/0090983 A1 | 4/2010 | Challener et al. |
| 2010/0103141 A1 | 4/2010 | Challener et al. |
| 2010/0113068 A1 | 5/2010 | Rothschild |
| 2010/0131268 A1 | 5/2010 | Moeller |
| 2010/0144387 A1 | 6/2010 | Chou |
| 2010/0163730 A1 | 7/2010 | Schmidt et al. |
| 2010/0234067 A1 | 9/2010 | Silverbrook et al. |
| 2010/0245582 A1 | 9/2010 | Harel |
| 2010/0245585 A1 | 9/2010 | Fisher et al. |
| 2010/0245826 A1 | 9/2010 | Lee |
| 2010/0314543 A1 | 12/2010 | Lee et al. |
| 2011/0043486 A1 | 2/2011 | Hagiwara et al. |
| 2011/0063446 A1 | 3/2011 | McMordie et al. |
| 2011/0102599 A1 | 5/2011 | Kwon et al. |
| 2011/0117532 A1 | 5/2011 | Relyea et al. |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2012/0007987 A1 | 1/2012 | Gaber |
| 2012/0083314 A1 | 4/2012 | Ng et al. |
| 2012/0184252 A1 | 7/2012 | Hirsch |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2012/0320086 A1 | 12/2012 | Kasama et al. |
| 2013/0204570 A1 | 8/2013 | Mendelson et al. |
| 2013/0278771 A1* | 10/2013 | Magoun et al. ............. 348/148 |
| 2013/0314536 A1* | 11/2013 | Frank et al. ................. 348/148 |
| 2013/0320220 A1 | 12/2013 | Donowsky |
| 2014/0112537 A1* | 4/2014 | Frank et al. ................. 382/103 |

FOREIGN PATENT DOCUMENTS

| | | |
|---|---|---|
| CN | 2899321 | 5/2007 |
| CN | 201203922 | 3/2009 |
| CN | 101635754 | 1/2010 |

(56) References Cited

FOREIGN PATENT DOCUMENTS

| | | |
|---|---|---|
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 202261481 | 5/2012 |
| CN | 102880289 | 1/2013 |
| CN | 202998279 | 6/2013 |
| DE | 102006057431 | 6/2008 |
| EP | 2477391 | 7/2012 |
| JP | 1997275518 | 4/1999 |
| JP | 2004048571 | 2/2004 |
| JP | 2006098098 | 4/2006 |
| JP | 2006105655 | 4/2006 |
| JP | 2007006475 | 1/2007 |
| JP | 2007325842 | 12/2007 |
| JP | 2010181324 | 8/2010 |
| JP | 2012231309 | 11/2012 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20060071220 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 100645746 | 5/2006 |
| KR | 20060054877 | 5/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |

(56) References Cited

FOREIGN PATENT DOCUMENTS

| | | |
|---|---|---|
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 1006660 | 1/2011 |
| KR | 20110006437 | 1/2011 |
| KR | 20110011264 | 2/2011 |
| KR | 2011019994 | 3/2011 |
| KR | 2011024290 | 3/2011 |
| KR | 101111167 | 4/2011 |
| KR | 1111167 | 2/2012 |
| KR | 1020130142810 | 12/2013 |
| TW | 201116030 | 5/2011 |
| WO | WO 03/093963 | 11/2003 |
| WO | WO 2005/002228 | 1/2005 |
| WO | WO 2005/088846 | 9/2005 |
| WO | WO 2006/112866 | 10/2006 |
| WO | WO 2007/006242 | 1/2007 |
| WO | WO 2009/122114 | 10/2009 |
| WO | WO 2010/005152 | 1/2010 |
| WO | WO 2010/033142 | 3/2010 |

\* cited by examiner

SYSTEMS AND METHODS FOR MONITORING VEHICLE OCCUPANTS

CROSS-REFERENCE TO RELATED APPLICATIONS

This patent application is a continuation of U.S. patent application Ser. No. 13/902,177 filed May 24, 2013, which claims the benefit of U.S. Provisional Patent Application No. 61/652,030 filed May 25, 2012 and entitled "SYSTEMS AND METHODS FOR MONITORING VEHICLE OCCUPANTS," which are all hereby incorporated by reference in their entirety.

This patent application is a continuation-in-part of International Patent Application No. PCT/US2012/041744 filed Jun. 8, 2012 and entitled "LOW POWER AND SMALL FORM FACTOR INFRARED IMAGING," which is incorporated herein by reference in its entirety.

International Patent Application No. PCT/US2012/041744 claims priority to and the benefit of U.S. Provisional Patent Application No. 61/656,889 filed Jun. 7, 2012 and entitled "LOW POWER AND SMALL FORM FACTOR INFRARED IMAGING," which are incorporated herein by reference in their entirety.

International Patent Application No. PCT/US2012/041744 claims priority to and the benefit of U.S. Provisional Patent Application No. 61/545,056 filed Oct. 7, 2011 and entitled "NON-UNIFORMITY CORRECTION TECHNIQUES FOR INFRARED IMAGING DEVICES," which are incorporated herein by reference in their entirety.

International Patent Application No. PCT/US2012/041744 claims priority to and the benefit of U.S. Provisional Patent Application No. 61/495,873 filed Jun. 10, 2011 and entitled "INFRARED CAMERA PACKAGING SYSTEMS AND METHODS," which are incorporated herein by reference in their entirety.

International Patent Application No. PCT/US2012/041744 claims priority to and the benefit of U.S. Provisional Patent Application No. 61/495,879 filed Jun. 10, 2011 and entitled "INFRARED CAMERA SYSTEM ARCHITECTURES," which are incorporated herein by reference in their entirety.

International Patent Application No. PCT/US2012/041744 claims priority to and the benefit of U.S. Provisional Patent Application No. 61/495,888 filed Jun. 10, 2011 and entitled "INFRARED CAMERA CALIBRATION TECHNIQUES," which are incorporated herein by reference in their entirety.

This patent application is a continuation-in-part of International Patent Application No. PCT/US2012/041749 filed Jun. 8, 2012 and entitled "NON-UNIFORMITY CORRECTION TECHNIQUES FOR INFRARED IMAGING DEVICES," which is incorporated herein by reference in its entirety.

International Patent Application No. PCT/US2012/041749 claims priority to and the benefit of U.S. Provisional Patent Application No. 61/545,056 filed Oct. 7, 2011 and entitled "NON-UNIFORMITY CORRECTION TECHNIQUES FOR INFRARED IMAGING DEVICES," which are incorporated herein by reference in their entirety.

International Patent Application No. PCT/US2012/041749 claims priority to and the benefit of U.S. Provisional Patent Application No. 61/495,873 filed Jun. 10, 2011 and entitled "INFRARED CAMERA PACKAGING SYSTEMS AND METHODS," which are incorporated herein by reference in their entirety.

International Patent Application No. PCT/US2012/041749 claims priority to and the benefit of U.S. Provisional Patent Application No. 61/495,879 filed Jun. 10, 2011 and entitled "INFRARED CAMERA SYSTEM ARCHITECTURES," which are incorporated herein by reference in their entirety.

International Patent Application No. PCT/US2012/041749 claims priority to and the benefit of U.S. Provisional Patent Application No. 61/495,888 filed Jun. 10, 2011 and entitled "INFRARED CAMERA CALIBRATION TECHNIQUES," which are incorporated herein by reference in their entirety.

This patent application is a continuation-in-part of International Patent Application No. PCT/US2012/041739 filed Jun. 8, 2012 and entitled "INFRARED CAMERA SYSTEM ARCHITECTURES," which is hereby incorporated by reference in its entirety.

International Patent Application No. PCT/US2012/041739 claims priority to and the benefit of U.S. Provisional Patent Application No. 61/495,873 filed Jun. 10, 2011 and entitled "INFRARED CAMERA PACKAGING SYSTEMS AND METHODS," which are incorporated herein by reference in their entirety.

International Patent Application No. PCT/US2012/041739 claims priority to and the benefit of U.S. Provisional Patent Application No. 61/495,879 filed Jun. 10, 2011 and entitled "INFRARED CAMERA SYSTEM ARCHITECTURES," which are incorporated herein by reference in their entirety.

International Patent Application No. PCT/US2012/041739 claims priority to and the benefit of U.S. Provisional Patent Application No. 61/495,888 filed Jun. 10, 2011 and entitled "INFRARED CAMERA CALIBRATION TECHNIQUES," which are incorporated herein by reference in their entirety.

This patent application is a continuation-in-part of U.S. patent application Ser. No. 13/622,178 filed Sep. 18, 2012 and entitled "SYSTEMS AND METHODS FOR PROCESSING INFRARED IMAGES," which is a continuation-in-part of U.S. patent application Ser. No. 13/529,772 filed Jun. 21, 2012 and entitled "SYSTEMS AND METHODS FOR PROCESSING INFRARED IMAGES," which is a continuation of U.S. patent application Ser. No. 12/396,340 filed Mar. 2, 2009 and entitled "SYSTEMS AND METHODS FOR PROCESSING INFRARED IMAGES," which are incorporated herein by reference in their entirety.

TECHNICAL FIELD

One or more embodiments of the invention relate generally to thermal imaging devices and more particularly, for example, to the use of thermal images to monitor occupants in a vehicle.

BACKGROUND

Many modern vehicles are equipped with reactive passenger restraints such as airbags, seatbelt tensioners, or other reactive restraints that are activated in an event of a collision to mitigate injury to occupants. To control deployment or activation of such reactive restraints, various types of occupancy sensors are typically installed in vehicles. For example, weight or pressure sensors are incorporated into seats to detect whether or not an occupant is present in a particular seat. In another example, various types of transducers, such as ultrasonic sensors, microwave sensors, active infrared rangefinders, and capacitive proximity sensors, have been proposed as refinements over weight sensors. Such transducers are typically required to be installed in large numbers (e.g., three to four per each occupant seat), at multiple locations, and in combination with various other types of sensors in order to detect some positional information of occupants.

However, such conventional occupancy sensors, even when many of them are used in combination, are still prone to false or failed detections, since they are easily tricked by non-human objects or are sensitive to ambient conditions such as humidity. Furthermore, such conventional occupancy sensors cannot provide occupant-related information other than an indication of presence and some limited positional information. As emphasis on vehicle safety and automation continues to grow, more comprehensive and detailed occupant-related information may be needed to automate various vehicle components, provide comprehensive monitoring, or otherwise improve safety and comfort of drivers and occupants.

SUMMARY

Various techniques are disclosed for systems and methods using small form factor infrared imaging modules to monitor occupants in an interior compartment of a vehicle. For example, a vehicle-mounted system may include one or more infrared imaging modules, a processor, a memory, alarm sirens, and a communication module. The vehicle-mounted system may be mounted on, installed in, or otherwise integrated into a vehicle that has an interior compartment. The infrared imaging modules may be configured to capture thermal images of desired portions of the interior compartments. Various thermal image processing and analytics may be performed on the captured thermal images to determine the presence and various attributes of one or more occupants. Based on the determination of the presence and various attributes, occupant detection information and/or control signals may be generated. Occupant detection information may be used to perform various monitoring operations, and control signals may adjust various vehicle components.

In one embodiment, a vehicle includes an interior compartment; an infrared imaging module comprising a focal plane array (FPA) configured to capture thermal images of at least a portion of the interior compartment; and a processor configured to analyze the thermal images to determine a presence of one or more occupants and one or more attributes associated with the one or more occupants, and generate occupant detection information based on the determination of the presence and the attributes of the one or more occupants.

In another embodiment, a vehicle includes an interior compartment; an adjustable component responsive to a control signal; an infrared imaging module comprising an FPA configured to capture thermal images of at least a portion of the interior compartment; and a processor configured to analyze the thermal images to determine a presence of one or more occupants and one or more attributes associated with the one or more occupants, and generate the control signal based on the determination of the presence and the attributes of the one or more occupants.

In another embodiment, a method includes capturing, at an FPA of an infrared imaging module, thermal images of at least a portion of an interior compartment of a vehicle, wherein the infrared imaging module is mounted in or on the vehicle so that the at least a portion of the interior compartment is within a field of view (FOV) of the infrared imaging module; analyzing the thermal images to determine a presence of one or more occupants and one or more attributes associated with the one or more occupants; and generating occupant detection information based on the determination of the presence and the attributes of the one or more occupants.

In another embodiment, a method includes capturing, at an FPA of an infrared imaging module, thermal images of at least a portion of an interior compartment of a vehicle, wherein the infrared imaging module is mounted in or on the vehicle so that the at least a portion of the interior compartment is within an FOV of the infrared imaging module; analyzing the thermal images to determine a presence of one or more occupants and one or more attributes associated with the one or more occupants; generating a control signal for an adjustable component of the vehicle based on the determination of the presence and the attributes of the one or more occupants; and providing the control signal to the adjustable component.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
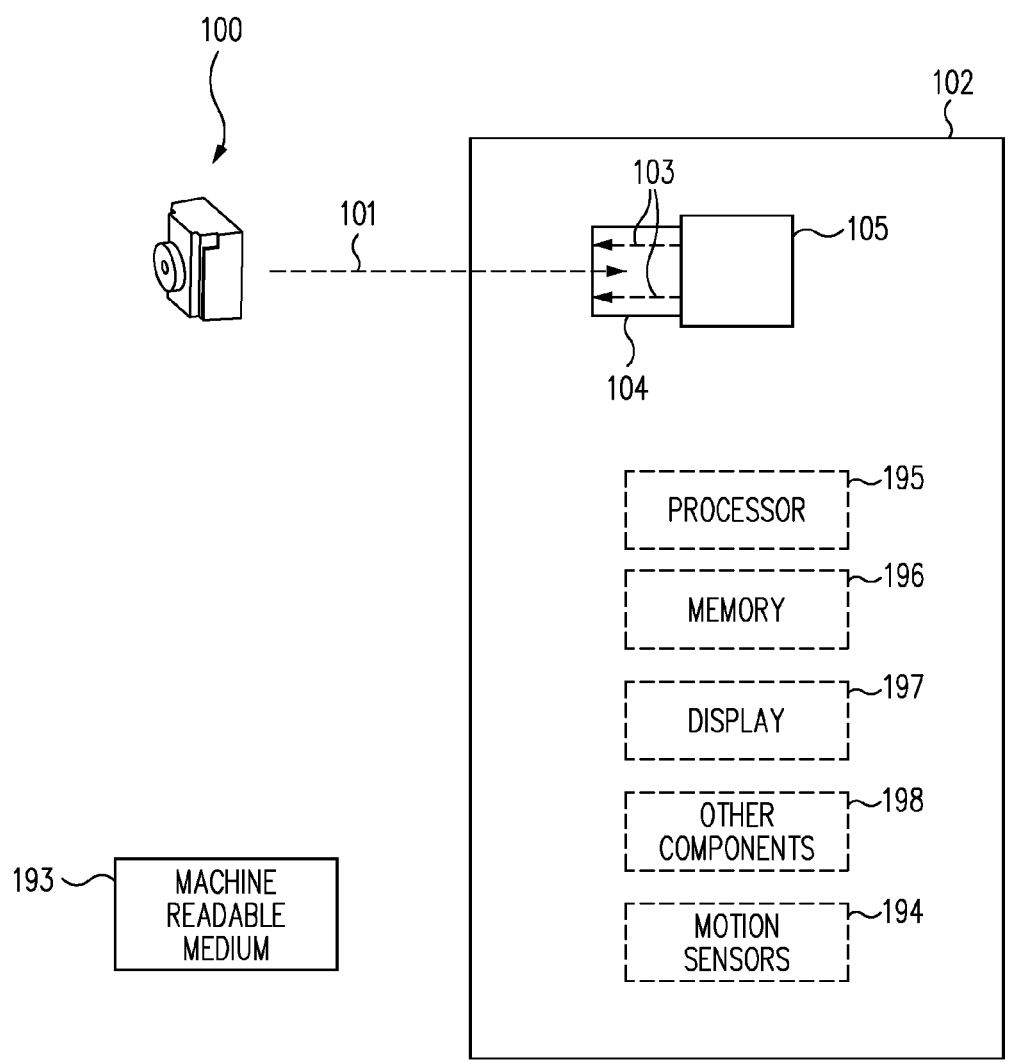
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques or other packaging techniques.

In one embodiment, infrared imaging module 100 may be configured to be implemented in a small portable host device 102, such as a mobile telephone, a tablet computing device, a laptop computing device, a personal digital assistant, a visible light camera, a music player, or any other appropriate mobile device. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over an environmental temperature range of approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated with reduced measures to compensate for such self heating.

Figure 2:
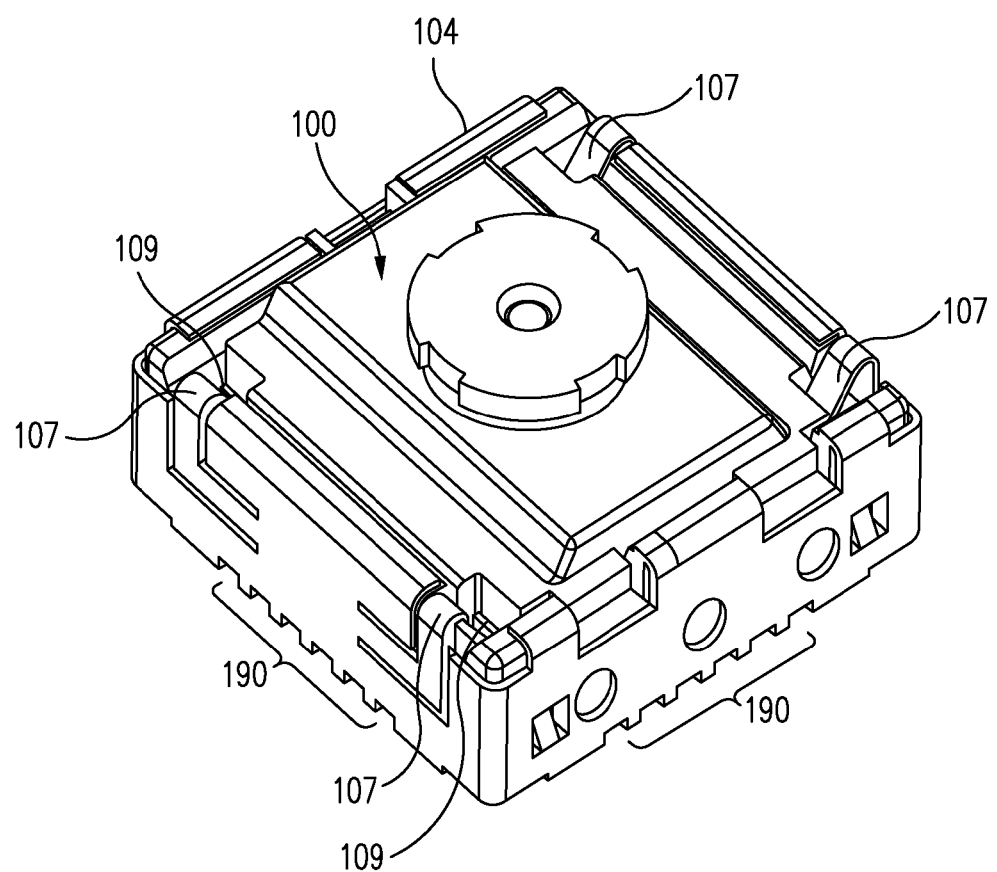
FIG. 2 illustrates an assembled infrared imaging module in accordance with an embodiment of the disclosure.

As shown in FIG. 1, host device 102 may include a socket 104, a shutter 105, motion sensors 194, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Motion sensors 194 may be implemented by one or more accelerometers, gyroscopes, or other appropriate devices that may be used to detect movement of host device 102. Motion sensors 194 may be monitored by and provide information to processing module 160 or processor 195 to detect motion. In various embodiments, motion sensors 194 may be implemented as part of host device 102 (as shown in FIG. 1), infrared imaging module 100, or other devices attached to or otherwise interfaced with host device 102.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., clocks, temperature sensors, a visible light camera, or other components). In addition, a machine readable medium 193 may be provided for storing non-transitory instructions for loading into memory 196 and execution by processor 195.

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
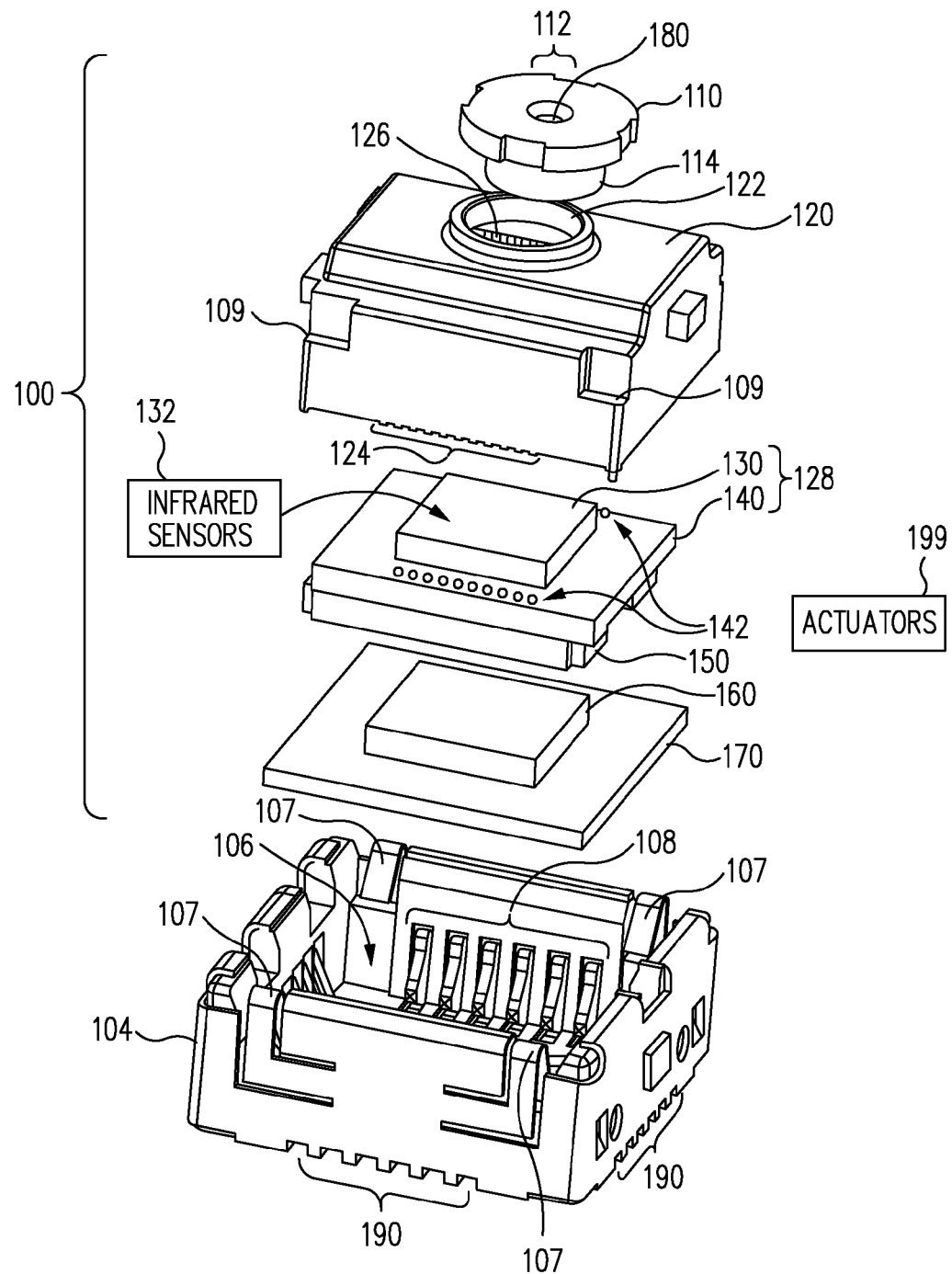
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 (e.g., a lens) which is partially visible in FIG. 3 through an aperture 112 in lens barrel 110. Lens barrel 110 may include a substantially cylindrical extension 114 which may be used to interface lens barrel 110 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130. For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIGS. 5A, 5B, and 5C. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Figure 4:
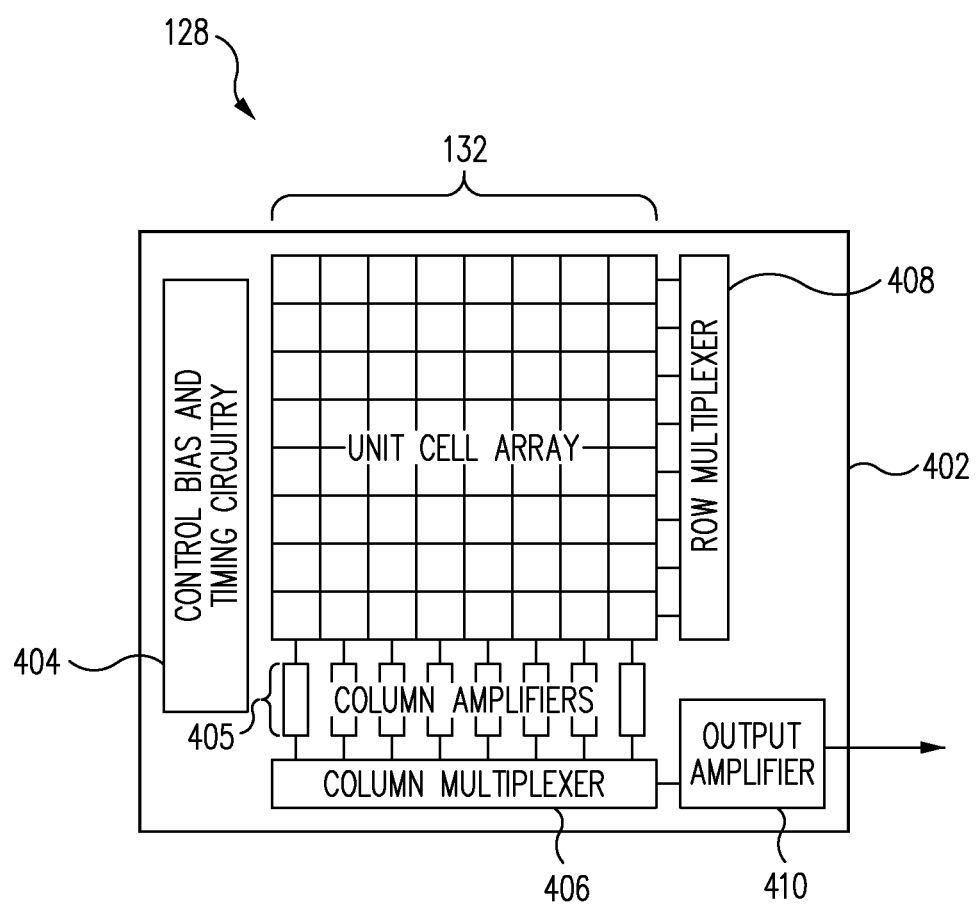
FIG. 4 illustrates a block diagram of infrared sensor assembly including an array of infrared sensors in accordance with an embodiment of the disclosure.

FIG. 4 illustrates a block diagram of infrared sensor assembly 128 including an array of infrared sensors 132 in accordance with an embodiment of the disclosure. In the illustrated embodiment, infrared sensors 132 are provided as part of a unit cell array of a ROIC 402. ROIC 402 includes bias generation and timing control circuitry 404, column amplifiers 405, a column multiplexer 406, a row multiplexer 408, and an output amplifier 410. Image frames (e.g., thermal images) captured by infrared sensors 132 may be provided by output amplifier 410 to processing module 160, processor 195, and/or any other appropriate components to perform various processing techniques described herein. Although an 8 by 8 array is shown in FIG. 4, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Infrared sensor assembly 128 may capture images (e.g., image frames) and provide such images from its ROIC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

In some embodiments, infrared imaging module 100 may further include one or more actuators 199 which may be used to adjust the focus of infrared image frames captured by infrared sensor assembly 128. For example, actuators 199 may be used to move optical element 180, infrared sensors 132, and/or other components relative to each other to selectively focus and defocus infrared image frames in accordance with techniques described herein. Actuators 199 may be implemented in accordance with any type of motion-inducing apparatus or mechanism, and may positioned at any location within or external to infrared imaging module 100 as appropriate for different applications.

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 in various embodiments). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Other connections may be used in other embodiments. For example, in one embodiment, sensor assembly 128 may be attached to processing module 160 through a ceramic board that connects to sensor assembly 128 by wire bonds and to processing module 160 by a ball grid array (BGA). In another embodiment, sensor assembly 128 may be mounted directly on a rigid flexible board and electrically connected with wire bonds, and processing module 160 may be mounted and connected to the rigid flexible board with wire bonds or a BGA.

The various implementations of infrared imaging module 100 and host device 102 set forth herein are provided for purposes of example, rather than limitation. In this regard, any of the various techniques described herein may be applied to any infrared camera system, infrared imager, or other device for performing infrared/thermal imaging.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. Socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a NUC process or other calibration processes) for infrared imaging module 100 as would be understood by one skilled in the art.

In various embodiments, shutter 105 may be made from various materials such as, for example, polymers, glass, aluminum (e.g., painted or anodized) or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers or infrared transmitting materials such as silicon, germanium, zinc selenide, or chalcogenide glasses) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art.

Alternatively, in another embodiment, a shutter (e.g., shutter 105 or other type of external or internal shutter) need not be provided, but rather a NUC process or other type of calibration may be performed using shutterless techniques. In another embodiment, a NUC process or other type of calibration using shutterless techniques may be performed in combination with shutter-based techniques.

Infrared imaging module 100 and host device 102 may be implemented in accordance with any of the various techniques set forth in U.S. Provisional Patent Application No. 61/495,873 filed Jun. 10, 2011, U.S. Provisional Patent Application No. 61/495,879 filed Jun. 10, 2011, and U.S. Provisional Patent Application No. 61/495,888 filed Jun. 10, 2011, which are incorporated herein by reference in their entirety.

In various embodiments, the components of host device 102 and/or infrared imaging module 100 may be implemented as a local or distributed system with components in communication with each other over wired and/or wireless networks. Accordingly, the various operations identified in this disclosure may be performed by local and/or remote components as may be desired in particular implementations.

Figure 5:
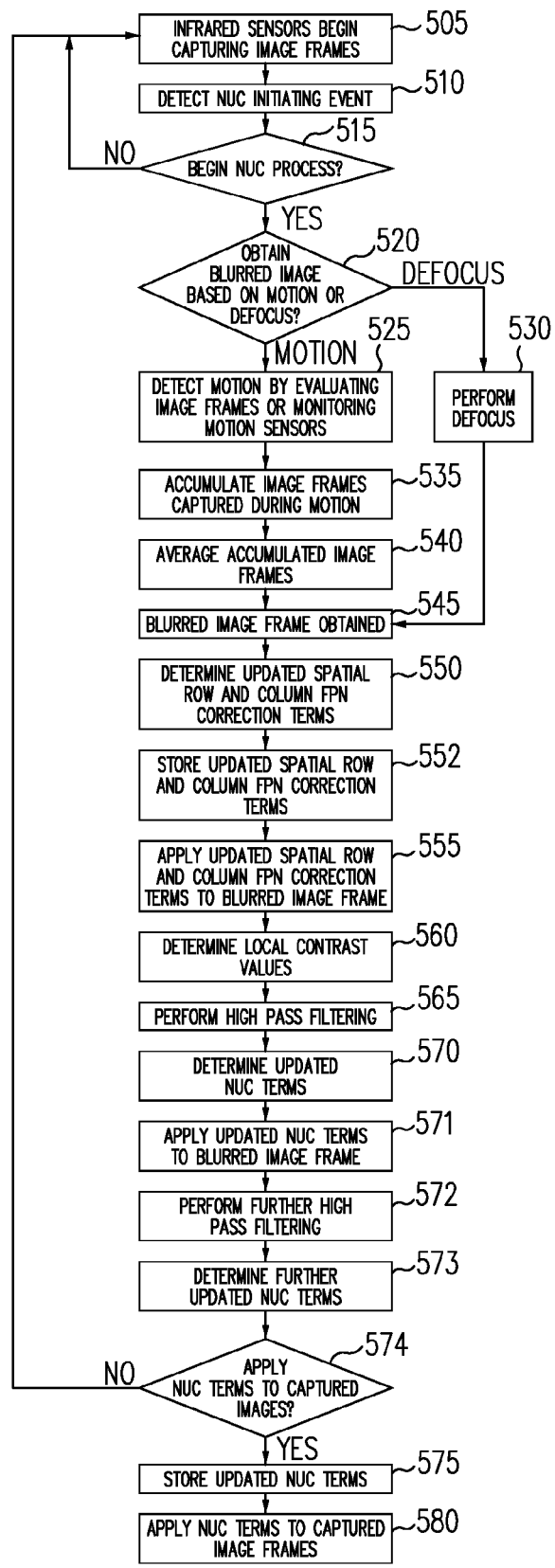
FIG. 5 illustrates a flow diagram of various operations to determine NUC terms in accordance with an embodiment of the disclosure.

FIG. 5 illustrates a flow diagram of various operations to determine NUC terms in accordance with an embodiment of the disclosure. In some embodiments, the operations of FIG. 5 may be performed by processing module 160 or processor 195 (both also generally referred to as a processor) operating on image frames captured by infrared sensors 132.

In block 505, infrared sensors 132 begin capturing image frames of a scene. Typically, the scene will be the real world environment in which host device 102 is currently located. In this regard, shutter 105 (if optionally provided) may be opened to permit infrared imaging module to receive infrared radiation from the scene. Infrared sensors 132 may continue capturing image frames during all operations shown in FIG. 5. In this regard, the continuously captured image frames may be used for various operations as further discussed. In one embodiment, the captured image frames may be temporally filtered (e.g., in accordance with the process of block 826 further described herein with regard to FIG. 8) and be processed by other terms (e.g., factory gain terms 812, factory offset terms 816, previously determined NUC terms 817, column FPN terms 820, and row FPN terms 824 as further described herein with regard to FIG. 8) before they are used in the operations shown in FIG. 5.

In block 510, a NUC process initiating event is detected. In one embodiment, the NUC process may be initiated in response to physical movement of host device 102. Such movement may be detected, for example, by motion sensors 194 which may be polled by a processor. In one example, a user may move host device 102 in a particular manner, such as by intentionally waving host device 102 back and forth in an "erase" or "swipe" movement. In this regard, the user may move host device 102 in accordance with a predetermined speed and direction (velocity), such as in an up and down, side to side, or other pattern to initiate the NUC process. In this example, the use of such movements may permit the user to intuitively operate host device 102 to simulate the "erasing" of noise in captured image frames.

In another example, a NUC process may be initiated by host device 102 if motion exceeding a threshold value is exceeded (e.g., motion greater than expected for ordinary use). It is contemplated that any desired type of spatial translation of host device 102 may be used to initiate the NUC process.

In yet another example, a NUC process may be initiated by host device 102 if a minimum time has elapsed since a previously performed NUC process. In a further example, a NUC process may be initiated by host device 102 if infrared imaging module 100 has experienced a minimum temperature change since a previously performed NUC process. In a still further example, a NUC process may be continuously initiated and repeated.

In block 515, after a NUC process initiating event is detected, it is determined whether the NUC process should actually be performed. In this regard, the NUC process may be selectively initiated based on whether one or more additional conditions are met. For example, in one embodiment, the NUC process may not be performed unless a minimum time has elapsed since a previously performed NUC process. In another embodiment, the NUC process may not be performed unless infrared imaging module 100 has experienced a minimum temperature change since a previously performed NUC process. Other criteria or conditions may be used in other embodiments. If appropriate criteria or conditions have been met, then the flow diagram continues to block 520. Otherwise, the flow diagram returns to block 505.

In the NUC process, blurred image frames may be used to determine NUC terms which may be applied to captured image frames to correct for FPN. As discussed, in one embodiment, the blurred image frames may be obtained by accumulating multiple image frames of a moving scene (e.g., captured while the scene and/or the thermal imager is in motion). In another embodiment, the blurred image frames may be obtained by defocusing an optical element or other component of the thermal imager.

Accordingly, in block 520 a choice of either approach is provided. If the motion-based approach is used, then the flow diagram continues to block 525. If the defocus-based approach is used, then the flow diagram continues to block 530.

Referring now to the motion-based approach, in block 525 motion is detected. For example, in one embodiment, motion may be detected based on the image frames captured by infrared sensors 132. In this regard, an appropriate motion detection process (e.g., an image registration process, a frame-to-frame difference calculation, or other appropriate process) may be applied to captured image frames to determine whether motion is present (e.g., whether static or moving image frames have been captured). For example, in one embodiment, it can be determined whether pixels or regions around the pixels of consecutive image frames have changed more than a user defined amount (e.g., a percentage and/or threshold value). If at least a given percentage of pixels have changed by at least the user defined amount, then motion will be detected with sufficient certainty to proceed to block 535.

In another embodiment, motion may be determined on a per pixel basis, wherein only pixels that exhibit significant changes are accumulated to provide the blurred image frame. For example, counters may be provided for each pixel and used to ensure that the same number of pixel values are accumulated for each pixel, or used to average the pixel values based on the number of pixel values actually accumulated for each pixel. Other types of image-based motion detection may be performed such as performing a Radon transform.

In another embodiment, motion may be detected based on data provided by motion sensors 194. In one embodiment, such motion detection may include detecting whether host device 102 is moving along a relatively straight trajectory through space. For example, if host device 102 is moving along a relatively straight trajectory, then it is possible that certain objects appearing in the imaged scene may not be sufficiently blurred (e.g., objects in the scene that may be aligned with or moving substantially parallel to the straight trajectory). Thus, in such an embodiment, the motion detected by motion sensors 194 may be conditioned on host device 102 exhibiting, or not exhibiting, particular trajectories.

In yet another embodiment, both a motion detection process and motion sensors 194 may be used. Thus, using any of these various embodiments, a determination can be made as to whether or not each image frame was captured while at least a portion of the scene and host device 102 were in motion relative to each other (e.g., which may be caused by host device 102 moving relative to the scene, at least a portion of the scene moving relative to host device 102, or both).

It is expected that the image frames for which motion was detected may exhibit some secondary blurring of the captured scene (e.g., blurred thermal image data associated with the scene) due to the thermal time constants of infrared sensors 132 (e.g., microbolometer thermal time constants) interacting with the scene movement.

In block 535, image frames for which motion was detected are accumulated. For example, if motion is detected for a continuous series of image frames, then the image frames of the series may be accumulated. As another example, if motion is detected for only some image frames, then the non-moving image frames may be skipped and not included in the accumulation. Thus, a continuous or discontinuous set of image frames may be selected to be accumulated based on the detected motion.

In block 540, the accumulated image frames are averaged to provide a blurred image frame. Because the accumulated image frames were captured during motion, it is expected that actual scene information will vary between the image frames and thus cause the scene information to be further blurred in the resulting blurred image frame (block 545).

In contrast, FPN (e.g., caused by one or more components of infrared imaging module 100) will remain fixed over at least short periods of time and over at least limited changes in scene irradiance during motion. As a result, image frames captured in close proximity in time and space during motion will suffer from identical or at least very similar FPN. Thus, although scene information may change in consecutive image frames, the FPN will stay essentially constant. By averaging, multiple image frames captured during motion will blur the scene information, but will not blur the FPN. As a result, FPN will remain more clearly defined in the blurred image frame provided in block 545 than the scene information.

In one embodiment, 32 or more image frames are accumulated and averaged in blocks 535 and 540. However, any desired number of image frames may be used in other embodiments, but with generally decreasing correction accuracy as frame count is decreased.

Referring now to the defocus-based approach, in block 530, a defocus operation may be performed to intentionally defocus the image frames captured by infrared sensors 132. For example, in one embodiment, one or more actuators 199 may be used to adjust, move, or otherwise translate optical element 180, infrared sensor assembly 128, and/or other components of infrared imaging module 100 to cause infrared sensors 132 to capture a blurred (e.g., unfocused) image frame of the scene. Other non-actuator based techniques are also contemplated for intentionally defocusing infrared image frames such as, for example, manual (e.g., user-initiated) defocusing.

Although the scene may appear blurred in the image frame, FPN (e.g., caused by one or more components of infrared imaging module 100) will remain unaffected by the defocusing operation. As a result, a blurred image frame of the scene will be provided (block 545) with FPN remaining more clearly defined in the blurred image than the scene information.

In the above discussion, the defocus-based approach has been described with regard to a single captured image frame. In another embodiment, the defocus-based approach may include accumulating multiple image frames while the infrared imaging module 100 has been defocused and averaging the defocused image frames to remove the effects of temporal noise and provide a blurred image frame in block 545.

Thus, it will be appreciated that a blurred image frame may be provided in block 545 by either the motion-based approach or the defocus-based approach. Because much of the scene information will be blurred by either motion, defocusing, or both, the blurred image frame may be effectively considered a low pass filtered version of the original captured image frames with respect to scene information.

In block 550, the blurred image frame is processed to determine updated row and column FPN terms (e.g., if row and column FPN terms have not been previously determined then the updated row and column FPN terms may be new row and column FPN terms in the first iteration of block 550). As used in this disclosure, the terms row and column may be used interchangeably depending on the orientation of infrared sensors 132 and/or other components of infrared imaging module 100.

In one embodiment, block 550 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics of amplifiers in ROIC 402 which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

Figure 6:
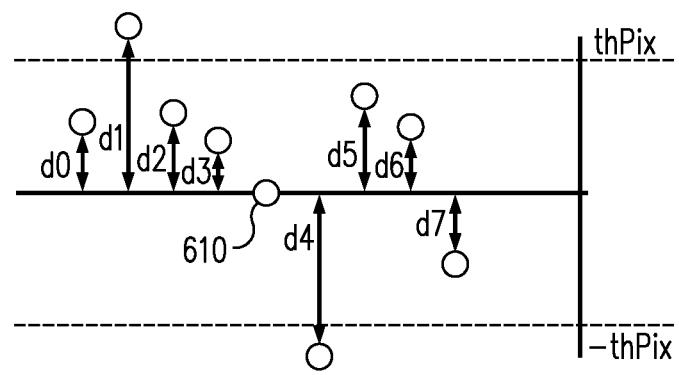
FIG. 6 illustrates differences between neighboring pixels in accordance with an embodiment of the disclosure.

In one embodiment, row and column FPN terms may be determined by considering differences between neighboring pixels of the blurred image frame. For example, FIG. 6 illustrates differences between neighboring pixels in accordance with an embodiment of the disclosure. Specifically, in FIG. 6 a pixel 610 is compared to its 8 nearest horizontal neighbors: d0-d3 on one side and d4-d7 on the other side. Differences between the neighbor pixels can be averaged to obtain an estimate of the offset error of the illustrated group of pixels. An offset error may be calculated for each pixel in a row or column and the average result may be used to correct the entire row or column.

To prevent real scene data from being interpreted as noise, upper and lower threshold values may be used (thPix and −thPix). Pixel values falling outside these threshold values (pixels d1 and d4 in this example) are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 5, the updated row and column FPN terms determined in block 550 are stored (block 552) and applied (block 555) to the blurred image frame provided in block 545. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 560, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 560.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 560 may be performed on the blurred image frame after row and column FPN terms have been applied to the blurred image frame (e.g., as shown in FIG. 5). In another embodiment, block 560 may be performed prior to block 550 to determine contrast before row and column FPN terms are determined (e.g., to prevent scene based contrast from contributing to the determination of such terms).

Following block 560, it is expected that any high spatial frequency content remaining in the blurred image frame may be generally attributed to spatially uncorrelated FPN. In this regard, following block 560, much of the other noise or actual desired scene based information has been removed or excluded from the blurred image frame due to: intentional blurring of the image frame (e.g., by motion or defocusing in blocks 520 through 545), application of row and column FPN terms (block 555), and contrast determination of (block 560).

Thus, it can be expected that following block 560, any remaining high spatial frequency content (e.g., exhibited as areas of contrast or differences in the blurred image frame) may be attributed to spatially uncorrelated FPN. Accordingly, in block 565, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In block 570, a flat field correction process is performed on the high pass filtered blurred image frame to determine updated NUC terms (e.g., if a NUC process has not previously been performed then the updated NUC terms may be new NUC terms in the first iteration of block 570).

Figure 7:
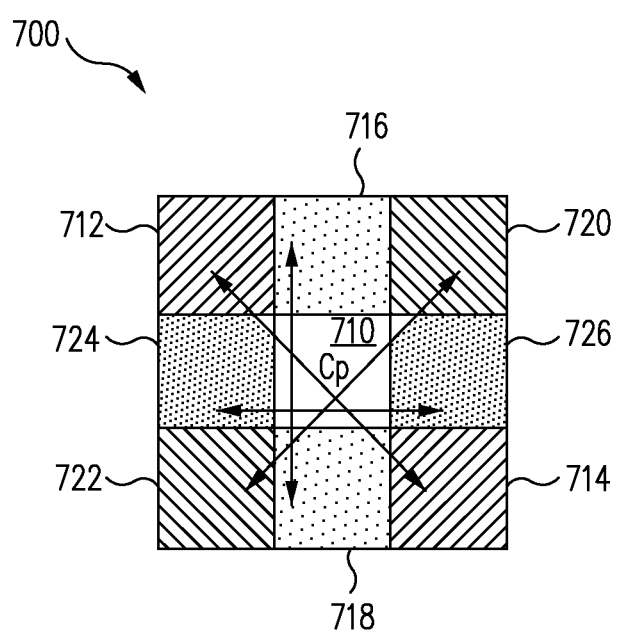
FIG. 7 illustrates a flat field correction technique in accordance with an embodiment of the disclosure.

For example, FIG. 7 illustrates a flat field correction technique 700 in accordance with an embodiment of the disclosure. In FIG. 7, a NUC term may be determined for each pixel 710 of the blurred image frame using the values of its neighboring pixels 712 to 726. For each pixel 710, several gradients may be determined based on the absolute difference between the values of various adjacent pixels. For example, absolute value differences may be determined between: pixels 712 and 714 (a left to right diagonal gradient), pixels 716 and 718 (a top to bottom vertical gradient), pixels 720 and 722 (a right to left diagonal gradient), and pixels 724 and 726 (a left to right horizontal gradient).

These absolute differences may be summed to provide a summed gradient for pixel 710. A weight value may be determined for pixel 710 that is inversely proportional to the summed gradient. This process may be performed for all pixels 710 of the blurred image frame until a weight value is provided for each pixel 710. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor λ between 0 and 1 may be chosen such that the new NUC term ($NUC_{NEW}$) stored is a weighted average of the old NUC term ($NUC_{OLD}$) and the estimated updated NUC term ($NUC_{UPDATE}$). In one embodiment, this can be expressed as $NUC_{NEW}=\lambda \cdot NUC_{OLD}+(1-\lambda) \cdot (NUC_{OLD}+NUC_{UPDATE})$.

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028,309 issued Feb. 22, 2000, U.S. Pat. No. 6,812,465 issued Nov. 2, 2004, and U.S. patent application Ser. No. 12/114,865 filed May 5, 2008, which are incorporated herein by reference in their entirety.

Referring again to FIG. 5, block 570 may include additional processing of the NUC terms. For example, in one embodiment, to preserve the scene signal mean, the sum of all NUC terms may be normalized to zero by subtracting the NUC term mean from each NUC term. Also in block 570, to avoid row and column noise from affecting the NUC terms, the mean value of each row and column may be subtracted from the NUC terms for each row and column. As a result, row and column FPN filters using the row and column FPN terms determined in block 550 may be better able to filter out row and column noise in further iterations (e.g., as further shown in FIG. 8) after the NUC terms are applied to captured images (e.g., in block 580 further discussed herein). In this regard, the row and column FPN filters may in general use more data to calculate the per row and per column offset coefficients (e.g., row and column FPN terms) and may thus provide a more robust alternative for reducing spatially correlated FPN than the NUC terms which are based on high pass filtering to capture spatially uncorrelated noise.

In blocks 571-573, additional high pass filtering and further determinations of updated NUC terms may be optionally performed to remove spatially correlated FPN with lower spatial frequency than previously removed by row and column FPN terms. In this regard, some variability in infrared sensors 132 or other components of infrared imaging module 100 may result in spatially correlated FPN noise that cannot be easily modeled as row or column noise. Such spatially correlated FPN may include, for example, window defects on a sensor package or a cluster of infrared sensors 132 that respond differently to irradiance than neighboring infrared sensors 132. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 565 is performed with a small kernel (e.g., considering only immediately adjacent pixels that fall within a neighborhood of pixels affected by spatially correlated FPN), then broadly distributed spatially correlated FPN may not be detected.

Figure 11:
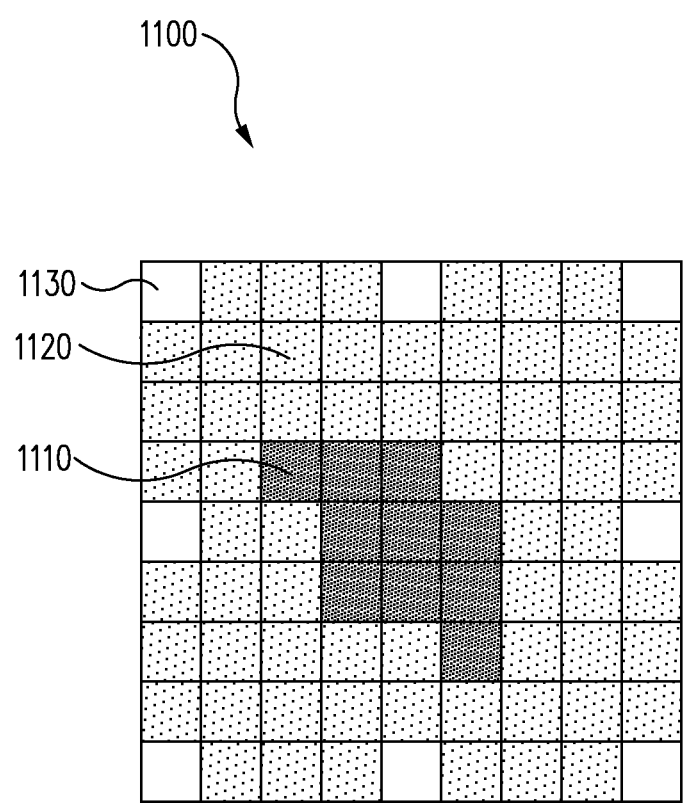
FIG. 11 illustrates spatially correlated FPN in a neighborhood of pixels in accordance with an embodiment of the disclosure.

For example, FIG. 11 illustrates spatially correlated FPN in a neighborhood of pixels in accordance with an embodiment of the disclosure. As shown in a sample image frame 1100, a neighborhood of pixels 1110 may exhibit spatially correlated FPN that is not precisely correlated to individual rows and columns and is distributed over a neighborhood of several pixels (e.g., a neighborhood of approximately 4 by 4 pixels in this example). Sample image frame 1100 also includes a set of pixels 1120 exhibiting substantially uniform response that are not used in filtering calculations, and a set of pixels 1130 that are used to estimate a low pass value for the neighborhood of pixels 1110. In one embodiment, pixels 1130 may be a number of pixels divisible by two in order to facilitate efficient hardware or software calculations.

Referring again to FIG. 5, in blocks 571-573, additional high pass filtering and further determinations of updated NUC terms may be optionally performed to remove spatially correlated FPN such as exhibited by pixels 1110. In block 571, the updated NUC terms determined in block 570 are applied to the blurred image frame. Thus, at this time, the blurred image frame will have been initially corrected for spatially correlated FPN (e.g., by application of the updated row and column FPN terms in block 555), and also initially corrected for spatially uncorrelated FPN (e.g., by application of the updated NUC terms applied in block 571).

In block 572, a further high pass filter is applied with a larger kernel than was used in block 565, and further updated NUC terms may be determined in block 573. For example, to detect the spatially correlated FPN present in pixels 1110, the high pass filter applied in block 572 may include data from a sufficiently large enough neighborhood of pixels such that differences can be determined between unaffected pixels (e.g., pixels 1120) and affected pixels (e.g., pixels 1110). For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor λ may be set close to 1 for updated NUC terms determined in block 573.

In various embodiments, blocks 571-573 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of blocks 571-573.

After blocks 571-573 are finished, a decision is made regarding whether to apply the updated NUC terms to captured image frames (block 574). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 505. Otherwise, the newly determined NUC terms are stored (block 575) to replace previous NUC terms (e.g., determined by a previously performed iteration of FIG. 5) and applied (block 580) to captured image frames.

Figure 8:
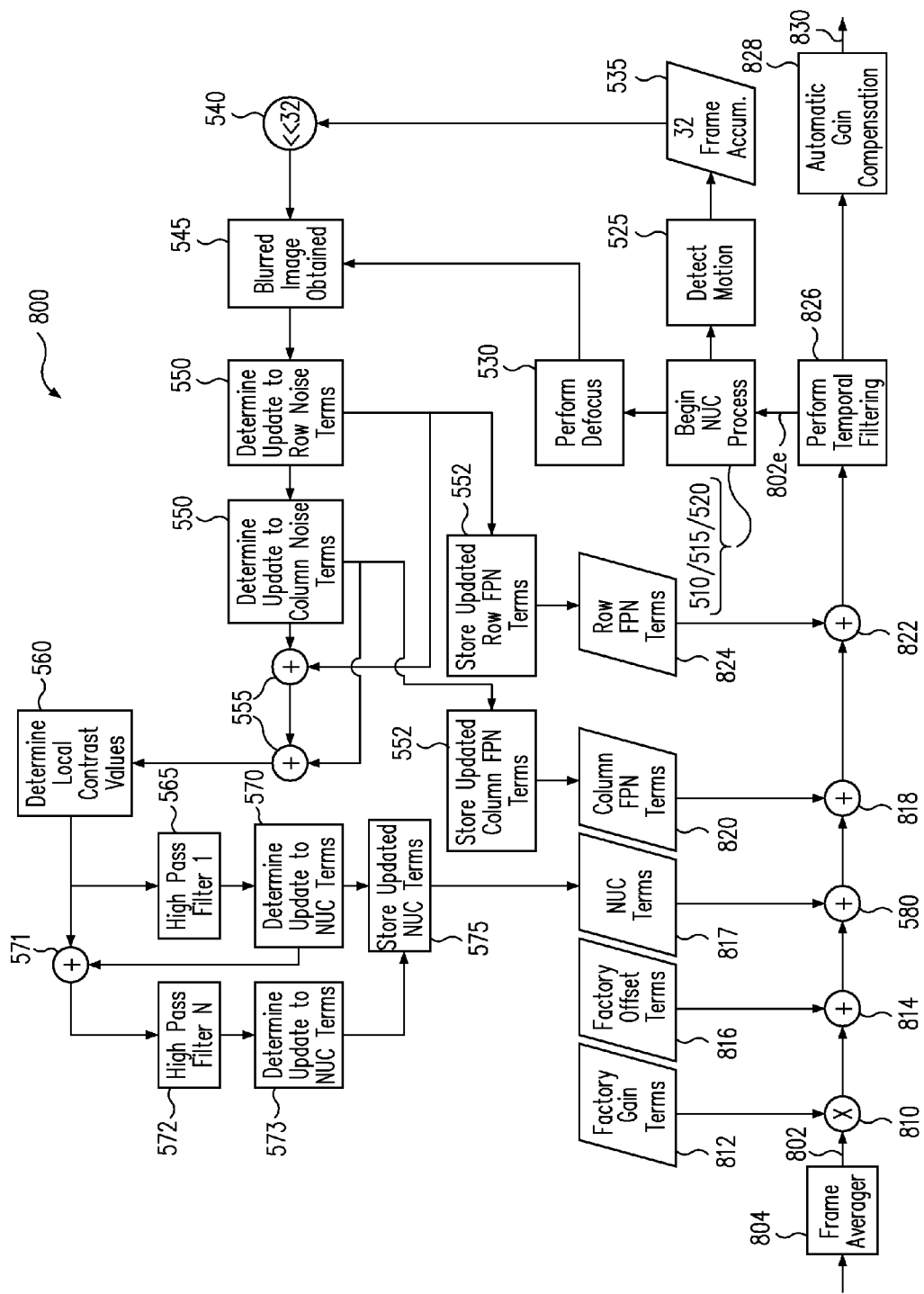
FIG. 8 illustrates various image processing techniques of FIG. 5 and other operations applied in an image processing pipeline in accordance with an embodiment of the disclosure.

FIG. 8 illustrates various image processing techniques of FIG. 5 and other operations applied in an image processing pipeline 800 in accordance with an embodiment of the disclosure. In this regard, pipeline 800 identifies various operations of FIG. 5 in the context of an overall iterative image processing scheme for correcting image frames provided by infrared imaging module 100. In some embodiments, pipeline 800 may be provided by processing module 160 or processor 195 (both also generally referred to as a processor) operating on image frames captured by infrared sensors 132.

Image frames captured by infrared sensors 132 may be provided to a frame averager 804 that integrates multiple image frames to provide image frames 802 with an improved signal to noise ratio. Frame averager 804 may be effectively provided by infrared sensors 132, ROIC 402, and other components of infrared sensor assembly 128 that are implemented to support high image capture rates. For example, in one embodiment, infrared sensor assembly 128 may capture infrared image frames at a frame rate of 240 Hz (e.g., 240 images per second). In this embodiment, such a high frame rate may be implemented, for example, by operating infrared sensor assembly 128 at relatively low voltages (e.g., compatible with mobile telephone voltages)

and by using a relatively small array of infrared sensors 132 (e.g., an array of 64 by 64 infrared sensors in one embodiment).

In one embodiment, such infrared image frames may be provided from infrared sensor assembly 128 to processing module 160 at a high frame rate (e.g., 240 Hz or other frame rates). In another embodiment, infrared sensor assembly 128 may integrate over longer time periods, or multiple time periods, to provide integrated (e.g., averaged) infrared image frames to processing module 160 at a lower frame rate (e.g., 30 Hz, 9 Hz, or other frame rates). Further information regarding implementations that may be used to provide high image capture rates may be found in U.S. Provisional Patent Application No. 61/495,879 previously referenced herein.

Image frames 802 proceed through pipeline 800 where they are adjusted by various terms, temporally filtered, used to determine the various adjustment terms, and gain compensated.

In blocks 810 and 814, factory gain terms 812 and factory offset terms 816 are applied to image frames 802 to compensate for gain and offset differences, respectively, between the various infrared sensors 132 and/or other components of infrared imaging module 100 determined during manufacturing and testing.

In block 580, NUC terms 817 are applied to image frames 802 to correct for FPN as discussed. In one embodiment, if NUC terms 817 have not yet been determined (e.g., before a NUC process has been initiated), then block 580 may not be performed or initialization values may be used for NUC terms 817 that result in no alteration to the image data (e.g., offsets for every pixel would be equal to zero).

In blocks 818 and 822, column FPN terms 820 and row FPN terms 824, respectively, are applied to image frames 802. Column FPN terms 820 and row FPN terms 824 may be determined in accordance with block 550 as discussed. In one embodiment, if the column FPN terms 820 and row FPN terms 824 have not yet been determined (e.g., before a NUC process has been initiated), then blocks 818 and 822 may not be performed or initialization values may be used for the column FPN terms 820 and row FPN terms 824 that result in no alteration to the image data (e.g., offsets for every pixel would be equal to zero).

Figure 9:
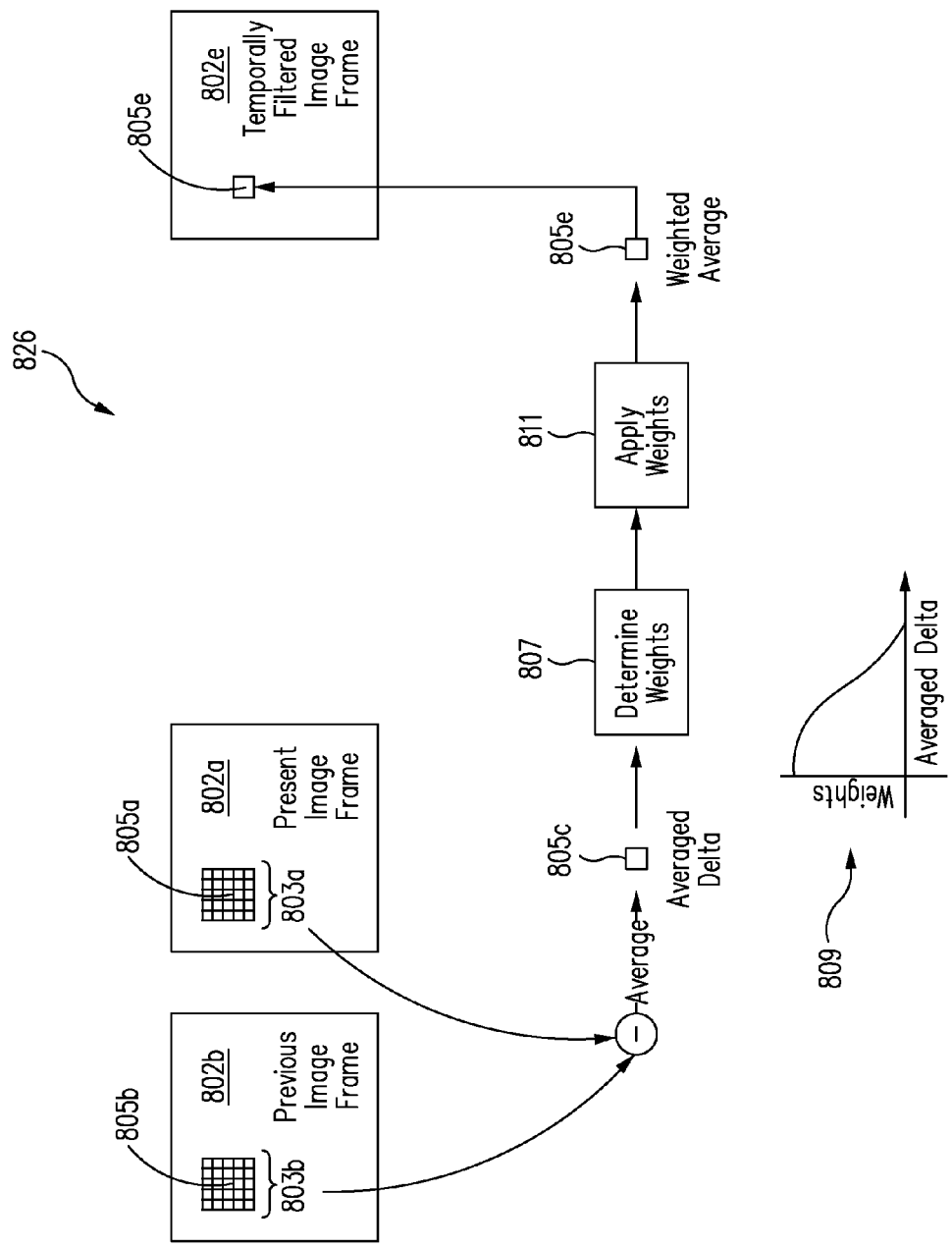
FIG. 9 illustrates a temporal noise reduction process in accordance with an embodiment of the disclosure.

In block 826, temporal filtering is performed on image frames 802 in accordance with a temporal noise reduction (TNR) process. FIG. 9 illustrates a TNR process in accordance with an embodiment of the disclosure. In FIG. 9, a presently received image frame 802*a* and a previously temporally filtered image frame 802*b* are processed to determine a new temporally filtered image frame 802*e*. Image frames 802*a* and 802*b* include local neighborhoods of pixels 803*a* and 803*b* centered around pixels 805*a* and 805*b*, respectively. Neighborhoods 803*a* and 803*b* correspond to the same locations within image frames 802*a* and 802*b* and are subsets of the total pixels in image frames 802*a* and 802*b*. In the illustrated embodiment, neighborhoods 803*a* and 803*b* include areas of 5 by 5 pixels. Other neighborhood sizes may be used in other embodiments.

Differences between corresponding pixels of neighborhoods 803*a* and 803*b* are determined and averaged to provide an averaged delta value 805*c* for the location corresponding to pixels 805*a* and 805*b*. Averaged delta value 805*c* may be used to determine weight values in block 807 to be applied to pixels 805*a* and 805*b* of image frames 802*a* and 802*b*.

In one embodiment, as shown in graph 809, the weight values determined in block 807 may be inversely proportional to averaged delta value 805*c* such that weight values drop rapidly towards zero when there are large differences between neighborhoods 803*a* and 803*b*. In this regard, large differences between neighborhoods 803*a* and 803*b* may indicate that changes have occurred within the scene (e.g., due to motion) and pixels 802*a* and 802*b* may be appropriately weighted, in one embodiment, to avoid introducing blur across frame-to-frame scene changes. Other associations between weight values and averaged delta value 805*c* may be used in various embodiments.

The weight values determined in block 807 may be applied to pixels 805*a* and 805*b* to determine a value for corresponding pixel 805*e* of image frame 802*e* (block 811). In this regard, pixel 805*e* may have a value that is a weighted average (or other combination) of pixels 805*a* and 805*b*, depending on averaged delta value 805*c* and the weight values determined in block 807.

For example, pixel 805*e* of temporally filtered image frame 802*e* may be a weighted sum of pixels 805*a* and 805*b* of image frames 802*a* and 802*b*. If the average difference between pixels 805*a* and 805*b* is due to noise, then it may be expected that the average change between neighborhoods 805*a* and 805*b* will be close to zero (e.g., corresponding to the average of uncorrelated changes). Under such circumstances, it may be expected that the sum of the differences between neighborhoods 805*a* and 805*b* will be close to zero. In this case, pixel 805*a* of image frame 802*a* may both be appropriately weighted so as to contribute to the value of pixel 805*e*.

However, if the sum of such differences is not zero (e.g., even differing from zero by a small amount in one embodiment), then the changes may be interpreted as being attributed to motion instead of noise. Thus, motion may be detected based on the average change exhibited by neighborhoods 805*a* and 805*b*. Under these circumstances, pixel 805*a* of image frame 802*a* may be weighted heavily, while pixel 805*b* of image frame 802*b* may be weighted lightly.

Other embodiments are also contemplated. For example, although averaged delta value 805*c* has been described as being determined based on neighborhoods 805*a* and 805*b*, in other embodiments averaged delta value 805*c* may be determined based on any desired criteria (e.g., based on individual pixels or other types of groups of sets of pixels).

In the above embodiments, image frame 802*a* has been described as a presently received image frame and image frame 802*b* has been described as a previously temporally filtered image frame. In another embodiment, image frames 802*a* and 802*b* may be first and second image frames captured by infrared imaging module 100 that have not been temporally filtered.

Figure 10:
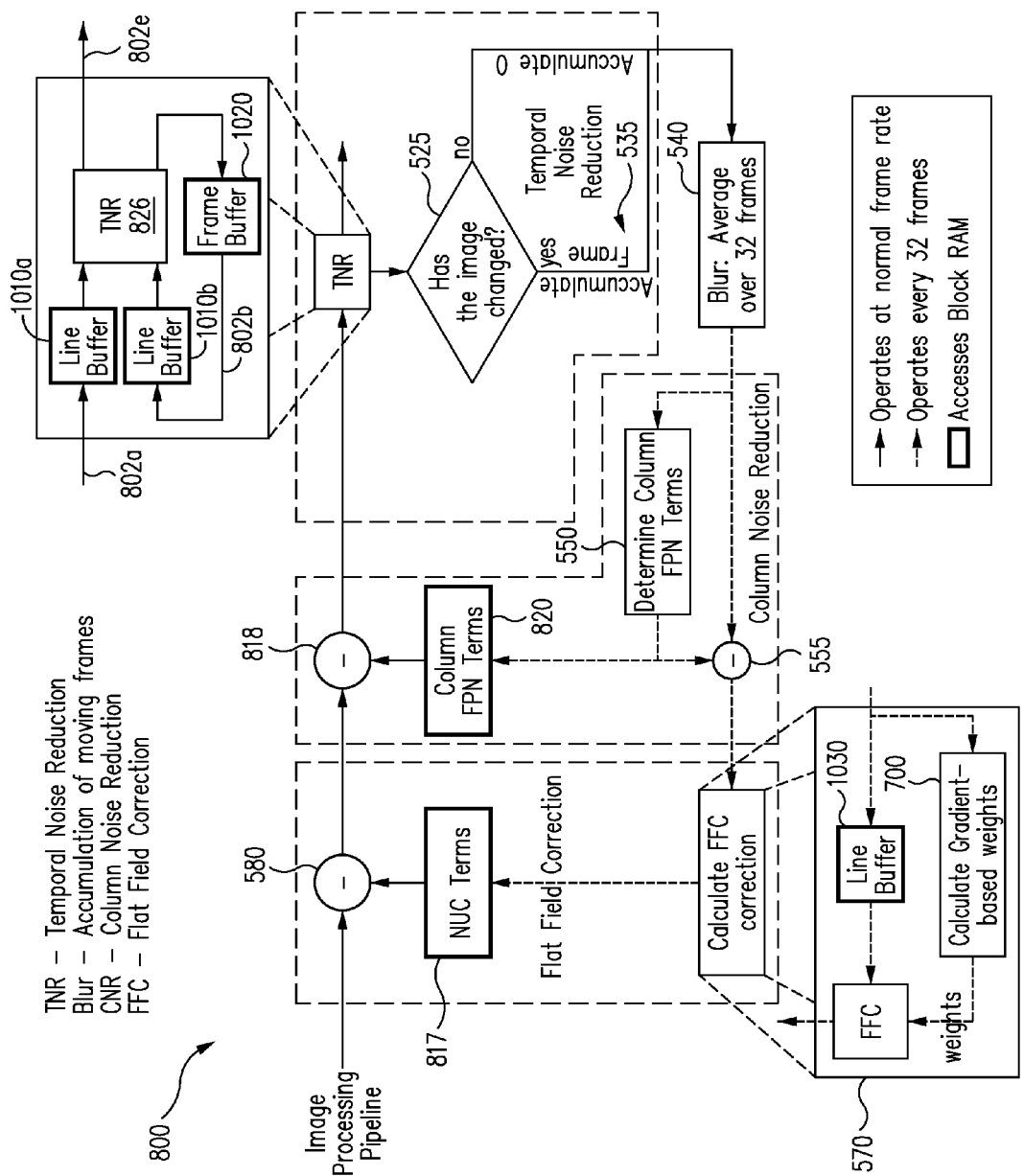
FIG. 10 illustrates particular implementation details of several processes of the image processing pipeline of FIG. 6 in accordance with an embodiment of the disclosure.

FIG. 10 illustrates further implementation details in relation to the TNR process of block 826. As shown in FIG. 10, image frames 802*a* and 802*b* may be read into line buffers 1010*a* and 1010*b*, respectively, and image frame 802*b* (e.g., the previous image frame) may be stored in a frame buffer 1020 before being read into line buffer 1010*b*. In one embodiment, line buffers 1010*a*-*b* and frame buffer 1020 may be implemented by a block of random access memory (RAM) provided by any appropriate component of infrared imaging module 100 and/or host device 102.

Referring again to FIG. 8, image frame 802*e* may be passed to an automatic gain compensation block 828 for further processing to provide a result image frame 830 that may be used by host device 102 as desired.

FIG. 8 further illustrates various operations that may be performed to determine row and column FPN terms and NUC terms as discussed. In one embodiment, these operations may use image frames 802*e* as shown in FIG. 8.

Because image frames 802e have already been temporally filtered, at least some temporal noise may be removed and thus will not inadvertently affect the determination of row and column FPN terms 824 and 820 and NUC terms 817. In another embodiment, non-temporally filtered image frames 802 may be used.

In FIG. 8, blocks 510, 515, and 520 of FIG. 5 are collectively represented together. As discussed, a NUC process may be selectively initiated and performed in response to various NUC process initiating events and based on various criteria or conditions. As also discussed, the NUC process may be performed in accordance with a motion-based approach (blocks 525, 535, and 540) or a defocus-based approach (block 530) to provide a blurred image frame (block 545). FIG. 8 further illustrates various additional blocks 550, 552, 555, 560, 565, 570, 571, 572, 573, and 575 previously discussed with regard to FIG. 5.

As shown in FIG. 8, row and column FPN terms 824 and 820 and NUC terms 817 may be determined and applied in an iterative fashion such that updated terms are determined using image frames 802 to which previous terms have already been applied. As a result, the overall process of FIG. 8 may repeatedly update and apply such terms to continuously reduce the noise in image frames 830 to be used by host device 102.

Referring again to FIG. 10, further implementation details are illustrated for various blocks of FIGS. 5 and 8 in relation to pipeline 800. For example, blocks 525, 535, and 540 are shown as operating at the normal frame rate of image frames 802 received by pipeline 800. In the embodiment shown in FIG. 10, the determination made in block 525 is represented as a decision diamond used to determine whether a given image frame 802 has sufficiently changed such that it may be considered an image frame that will enhance the blur if added to other image frames and is therefore accumulated (block 535 is represented by an arrow in this embodiment) and averaged (block 540).

Also in FIG. 10, the determination of column FPN terms 820 (block 550) is shown as operating at an update rate that in this example is 1/32 of the sensor frame rate (e.g., normal frame rate) due to the averaging performed in block 540. Other update rates may be used in other embodiments. Although only column FPN terms 820 are identified in FIG. 10, row FPN terms 824 may be implemented in a similar fashion at the reduced frame rate.

FIG. 10 also illustrates further implementation details in relation to the NUC determination process of block 570. In this regard, the blurred image frame may be read to a line buffer 1030 (e.g., implemented by a block of RAM provided by any appropriate component of infrared imaging module 100 and/or host device 102). The flat field correction technique 700 of FIG. 7 may be performed on the blurred image frame.

In view of the present disclosure, it will be appreciated that techniques described herein may be used to remove various types of FPN (e.g., including very high amplitude FPN) such as spatially correlated row and column FPN and spatially uncorrelated FPN.

Other embodiments are also contemplated. For example, in one embodiment, the rate at which row and column FPN terms and/or NUC terms are updated can be inversely proportional to the estimated amount of blur in the blurred image frame and/or inversely proportional to the magnitude of local contrast values (e.g., determined in block 560).

In various embodiments, the described techniques may provide advantages over conventional shutter-based noise correction techniques. For example, by using a shutterless process, a shutter (e.g., such as shutter 105) need not be provided, thus permitting reductions in size, weight, cost, and mechanical complexity. Power and maximum voltage supplied to, or generated by, infrared imaging module 100 may also be reduced if a shutter does not need to be mechanically operated. Reliability will be improved by removing the shutter as a potential point of failure. A shutterless process also eliminates potential image interruption caused by the temporary blockage of the imaged scene by a shutter.

Also, by correcting for noise using intentionally blurred image frames captured from a real world scene (not a uniform scene provided by a shutter), noise correction may be performed on image frames that have irradiance levels similar to those of the actual scene desired to be imaged. This can improve the accuracy and effectiveness of noise correction terms determined in accordance with the various described techniques.

Figure 12:
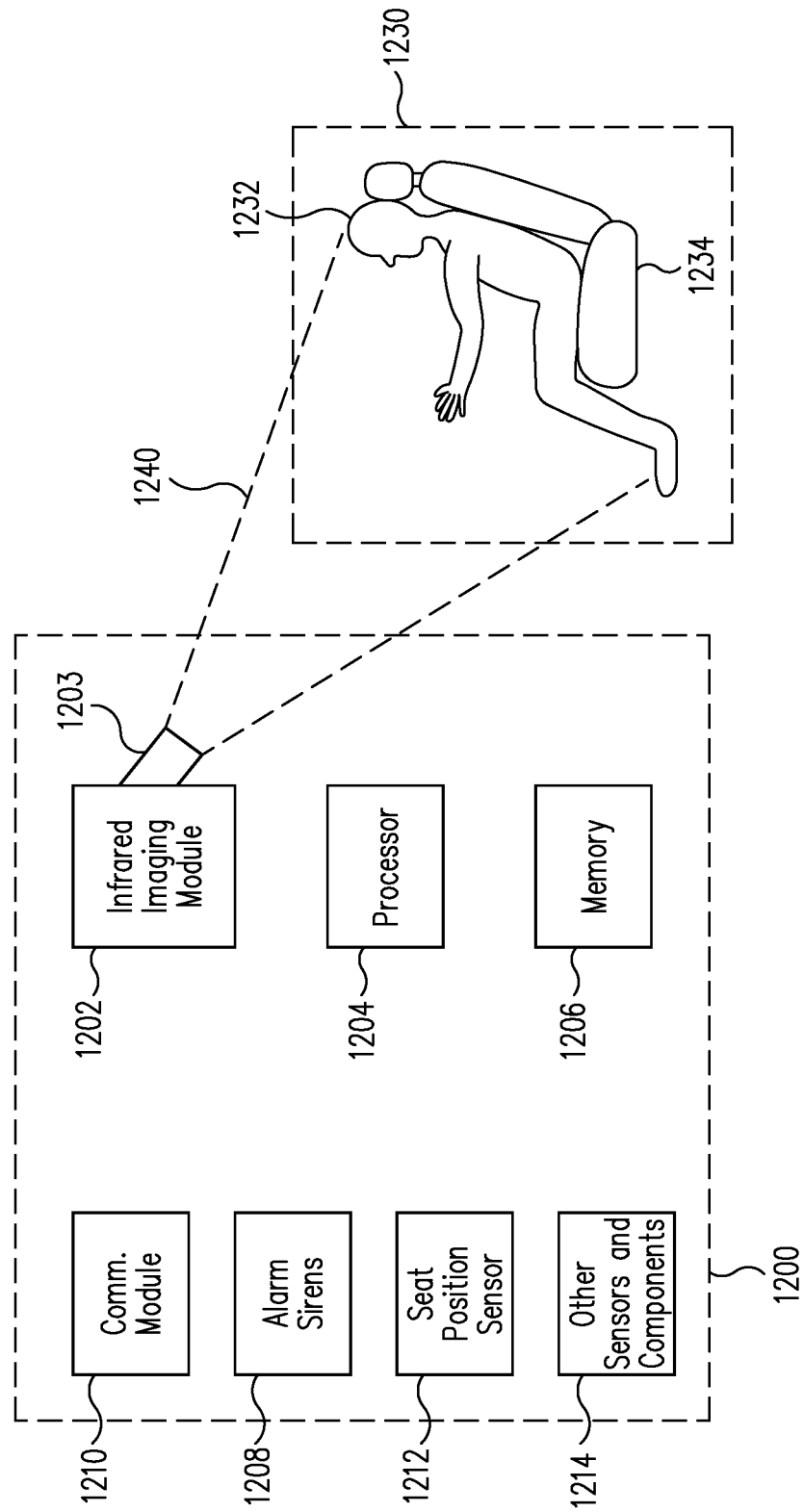
FIG. 12 illustrates a block diagram of a vehicle-mounted system for monitoring occupants in an interior compartment of a vehicle in accordance with an embodiment of the disclosure.

Referring now to FIG. 12, a block diagram is shown of a vehicle-mounted system 1200 for monitoring one or more occupants 1232 in an interior compartment 1230 of a vehicle in accordance with an embodiment of the disclosure. Vehicle-mounted system 1200 may include one or more: infrared imaging modules 1202, processors 1204, memories 1206, alarm sirens 1208, communication modules 1210, seat position sensors 1212, and/or other components 1214. In various embodiments, components of vehicle-mountable system 1200 may be implemented in the same or similar manner as corresponding components of host device 102 of FIG. 1. Moreover, components of vehicle-mountable system 1200 may be configured to perform various NUC processes and other processes described herein.

In some embodiments, infrared imaging module 1202 may be a small form factor infrared camera or a small form factor infrared imaging device implemented in accordance with various embodiments disclosed herein. Infrared imaging module 1202 may include an FPA implemented, for example, in accordance with various embodiments disclosed herein or others where appropriate.

Infrared imaging module 1202 may be configured to capture, process, and/or otherwise manage infrared images (e.g., including thermal images) of a desired portion of vehicle interior compartment 1230. In this regard, infrared imaging module 1202 may be mounted anywhere in or on a vehicle so that a desired portion of interior compartment 1230 is within a field of view (FOV) 1240 of infrared imaging module 1202. For example, infrared imaging module 1202 may be positioned so that at least a portion of occupant 1232 is within FOV 1240 when occupant 1232 is present and positioned in a seat 1234 of interior compartment 1230, as shown in FIG. 12.

In some embodiments, infrared imaging module 1202 may include one or more optical elements 1203 (e.g., one or more: infrared-transmissive lenses, infrared-transmissive prisms, infrared-reflective mirrors, infrared fiber optics, or other optical elements) that guide infrared radiation from a desired portion of interior compartment 1230 to an FPA of infrared imaging module 1202. Optical elements 1203 may be useful when it is difficult to mount infrared imaging module 1202 at a desired angle and/or location. For example, mirrors and/or prisms may be utilized to provide an overhead perspective view of a passenger compartment even when it is not feasible to mount infrared imaging module 1202 at an angle looking down on the passenger compartment (e.g., when mounting on a headliner with little or no room to tilt infrared imaging module 1202). Note also that optical elements 1203 may be used to suitably define or alter an FOV of infrared imaging module 1202. An adjustable FOV (e.g., selectable by infrared imaging module 1202 and/or processor 1204) may optionally be provided, which may be useful, for example, when a close-up view of occupant 1232 is desired.

Infrared images captured, processed, and/or otherwise managed by infrared imaging module 1202 may be radiometrically normalized infrared images (e.g., thermal images). That is, pixels that make up the captured image may contain calibrated thermal data (e.g., temperature). As discussed above in connection with infrared imaging module 100 of FIG. 1, infrared imaging module 1202 and/or associated components may be calibrated using appropriate techniques so that images captured by infrared imaging module 1202 are properly calibrated thermal images. In some embodiments, appropriate calibration processes may be performed periodically by infrared imaging module 1202 and/or processor 1204 so that infrared imaging module 1202, and hence the thermal images captured by it, may maintain proper calibration.

Radiometric normalization permits infrared imaging module 1202 and/or processor 1204 to efficiently detect, from the infrared images, objects having a specific range of temperature. Infrared imaging module 1202 and/or processor 1204 may detect such objects efficiently and effectively, because thermal images of objects having a specific temperature may be easily discernable from a background and other objects, and yet less susceptible to lighting conditions or obscuring (e.g., obscured by clothing). In contrast, object detection operations performed on visible light images (e.g., images captured by CMOS or CCD sensors) or non-normalized infrared images, such as performing edge detection and/or pattern recognition algorithms (e.g., using neural networks) on such images, may be computationally complex yet ineffective.

In one embodiment, infrared imaging module 1202 and/or processor 1204 may be configured to detect contiguous regions of pixels (also referred to as "blobs" or "hot blobs") having a temperature approximately in the range of a clothed person, for example, between approximately 75° F. (e.g., clothed part of a body) and approximately 110° F. (e.g., exposed part of a body such as a face and hands). Such "hot blobs" may indicate presence of persons in the thermal images, and may be analyzed further as described herein to ascertain the presence of one or more persons and determine various attributes associated with the detected persons.

Processor 1204 may be implemented as any appropriate processing device as described with regard to processor 195 in FIG. 1. In some embodiments, processor 1204 may be part of or implemented with other conventional on-board processors that may be installed on a vehicle. For example, a modern vehicle may have a processor for controlling and monitoring various mechanical operations of a vehicle, a processor for a passenger restraint system (e.g., an airbag system), a processor for a vehicle security system (e.g., a theft alarm and tracking system), a processor for a vehicle telematics and accident notification system (e.g., OnStar™, Ford Sync™, BMW Assist™, and other similar systems), a processor for an on-board entertainment and vehicle information system, and/or a processor for a satellite navigation system, any of which may be utilized to implement all or part of processor 1204. In other embodiments, processor 1204 may interface and communicate with such other conventional on-board processors and components associated with such processors.

Processor 1204 may be configured to interface and communicate with other components of vehicle-mounted system 1200 to perform methods and processes described herein. Processor 1204 may be configured to receive thermal images of one or more desired portions of interior compartment 1230 captured by one or more infrared imaging modules 1202. Processor 1204 may be configured to perform, on the received thermal images and the radiometric information contained therein, various thermal image processing and analysis operations as further described herein to detect whether one or more occupants are present in interior compartment 1230 and determine one or more attributes associated with the detected occupants (e.g., occupant 1232).

In one embodiment, processor 1204 may be further configured to generate occupant detection information based on the determination of the presence and the attributes of one or more occupants (e.g., occupant 1232). Based on the occupant detection information generated by processor 1204, vehicle-mounted system 1200 may perform various occupant monitoring operations described herein. For example, processor 1204 may be configured to detect an unwanted occupant (e.g., an intruder or an infant left unattended) in an interior compartment (e.g., a passenger cabin, a trunk, a cargo) of a vehicle based on the occupant detection information when the vehicle is locked and parked. If an unwanted occupant is detected, vehicle-mounted system 1200 may further respond by triggering an alarm and/or disabling the vehicle ignition to prevent theft.

In other example, the occupant detection information may include the location of a driver's face and hands in the thermal images. Processor 1204 may be configured to track the orientation and/or movement of the driver's face and hands based on the occupant detection information to determine whether the driver is inattentive or not, as further described herein. If the driver is determined to be inattentive to driving, vehicle-mounted system 1200 may further respond by triggering an alarm and/or slowing down the vehicle.

In yet another example, the occupant detection information may include a count of the detected occupants as well as respective positions and approximate body temperatures of the detected occupants. Processor 1204 may be configured to generate, based at least in part on the occupant detection information, occupant status information to be transmitted, for example, to a remote monitoring station for vehicle telematics and accident notification systems (e.g., OnStar™, Ford Sync 911™, BMW Assist™, and other similar systems) in an event of a collision. The occupant status information may include the count, positions, body temperatures, health conditions of the occupants, and/or a user-viewable image (e.g., a thermogram) of the interior compartment. In this regard, processor 1204 may be configured to determine the health condition of the occupant based on the body temperature and its variance. Further in this regard, processor 1204 may be configured to convert the thermal images into user-viewable images as further described herein. Such user-viewable images may be useful to rescue personnel in determining the status of vehicle occupants before and/or after the collision. At least part of the occupant status information may be stored in a memory or storage device (e.g., memory 1206), so that it can be retrieved and transmitted after a collision occurs.

In another embodiment, processor 1204 may be further configured to generate appropriate control signals to adjust various vehicle components based on the determination of the presence and the attributes of one or more occupants (e.g., occupant 1232). For example, processor 1204 may generate appropriate control signals to adjust various parameters for a passenger restraint system (e.g., airbags, seatbelts, and other passive and active restraints) based on whether or not an occupant is found in a particular seat, the size of the occupant, and/or the position of the occupant. Thus, for example, if an occupant of small stature is seated near a certain airbag, the deployment timing may be delayed, the deployment intensity may be reduced, and/or other parameters for that airbag may be suitably adjusted to reduce injury to the occupant in an event of a collision. Seatbelt tensioners may similarly be adjusted and/or disabled based on whether or not an occupant is found in a particular seat, the size of the occupant, and/or the position of the occupant.

In another example, processor 1204 may generate appropriate control signals to adjust various climate settings (e.g., to control individual vent openings and to control temperature and volume of air flowing through the individual vent openings) in a vehicle heating, ventilation, and air conditioning (HVAC) system, based on the number of occupants, respective positions of occupants, respective body temperatures of occupants, and/or the ambient temperature of an interior compartment. In this regard, processor 1204 may further be configured to determine the ambient temperature of an interior compartment from thermal images of at least a portion of the interior compartment capture by infrared imaging module 1202, as further described herein.

In yet another example, processor 1204 may generate appropriate control signals for motorized seat, steering column, and pedal adjusters, so as to adjust the fore-and-aft position, height, and/or angle of the seat (e.g., seat 1234), steering column, and/or pedals based on the determined size and/or position of an occupant. For example, if a driving seat is positioned too far back relative to the determined size of the driver, processor 1204 may generate a control signal to moved the seat forward. It is also contemplated that other vehicle components, such as an on-board entertainment system (e.g., audio, video monitors, or other audio visual components), may be controlled by processor 1204 based on the determined presence and attributes of occupants in an interior compartment of a vehicle.

Memory 1206 may include one or more memory devices to store data and information, including thermal images, occupant detection information, and occupant status information. The one or more memory devices may include various types of memory for thermal image and other information storage including volatile and non-volatile memory devices, such as RAM (Random Access Memory), ROM (Read-Only Memory), EEPROM (Electrically-Erasable Read-Only Memory), flash memory, a disk drive. In one embodiment, occupant status information may be periodically generated and stored in the one or more memory devices. Such stored status information may be retrieved and transmitted (e.g., to a remote monitoring station for accident notification systems, to a mobile device, or to other external devices) in an event of a collision to help emergency responders in rescuing occupants of a vehicle. In some embodiments, processor 1204 may be configured to execute software instructions stored on memory 1206 to perform various methods, processes, or operations in the manner described herein.

Alarm sirens 1208 may be implemented with various speakers, horns, bells, chimes, flashers, lights, or other appropriate devices for sounding various alarms generated by processor 1204. Alarm sirens 1208 may be sized, disposed, or otherwise adapted to warn occupants in an interior compartment (e.g., to warn inattentive drivers) or may be sized, disposed, otherwise adapted to emit lights and/or sounds externally (e.g., security system sirens to thwart or warn of intruders). In some embodiments, alarm sirens 1208 may be implemented on a key fob for remotely locking and unlocking vehicles, so that a driver away from the vehicle may be warned of alarms generated by processor 1204. It is contemplated that existing alarm sirens (e.g., for a vehicle security system), horns, chimes, lights, and/or flashers may be utilized as alarm sirens 1208.

Communication module 1210 may be configured to handle communication and interfacing between various components of vehicle-mounted system 1200. For example, components such as infrared imaging module 1202, alarm sirens 1208, seat position sensors 1212 and/or other components 1214 may transmit and receive data to and from processor 1204 through communication module 1210, which may manage wired and/or wireless connections (e.g., through proprietary RF links, proprietary infrared links, and/or standard wireless communication protocols such as IEEE 802.11 WiFi standards and Bluetooth™) between the various components.

Communication module 1210 may also be configured to allow components of vehicle-mounted system 1200 to communicate and interface with other existing vehicle electronic components. For example, processor 1204 may communicate, via communication module 1210, with a vehicle electronic control unit (ECU), a passenger restraint system, a vehicle telematics and accident notification system, an in-vehicle information and entertainment system, a satellite navigation system, and other existing sensors and electronic components. In this regard, communication module 1210 may support various interfaces, protocols, and standards for in-vehicle networking, such as the controller area network (CAN) bus, the vehicle area network (VAN) standard, the local interconnect network (LIN) bus, the media oriented systems transport (MOST) network, the ISO 11738 (or ISO bus) standard.

Communication module 1210 may be further configured to allow components of vehicle-mounted system 1200 to communicate with external devices over various wireless telecommunication networks, such as code division multiple access (CDMA) networks, enhanced data rates for GSM evolution (EDGE) networks, universal mobile telephone system (UMTS) networks, general packet radio service (GPRS) networks, high-speed downlink packet access (HSDPA) networks, and/or other appropriate networks. For example, processor 1204 may communicate occupant status information to remote monitoring stations, mobile devices, or other networked computers and devices via communication module 1210 over such wireless telecommunication networks. In another example, processor 1204 may transmit various alarms generated by processor 1204 as further described herein to various external devices via communication module 1210.

In some embodiments, vehicle-mounted system 1200 may comprise as many such communication modules 1210 as desired for various applications of vehicle-mounted system 1200 on various types of vehicle. In other embodiments, communication module 1210 may be integrated into or implemented as part of various other components of vehicle-mounted system 1200. For example, infrared imaging module 1202 and processor 1204 may each comprise a subcomponent that may be configured to perform the operations of communication module 1210, and may communicate with one another via wired and/or wireless connection without separate communication module 1210.

Seat position sensors 1212 may include one or more devices that may be configured to detect the fore-and-aft position, angle, and/or height of a seat (e.g., seat 1234). Seat position sensors 1212 may be implemented in any appropriate manner, including attaching mechanical switches, magnetometric sensors (e.g., Hall effect sensors), or other types of transducers to a seat track, seat back, and/or other suitable locations. The detected position, angle, and/or height of a seat may be used by infrared imaging module 1202 and/or processor 1204 to perform scale calibration of the thermal images. Because the size and/or position of an occupant within the captured thermal images may vary depending on the seat position, calibrating scaling information (e.g., correspondence between the size within thermal images to the actual size) using information from seat position sensors 1212 may provide a more accurate estimation of the size and/or position of occupants.

Other components 1214 may include any other device or sensor as may be desired for various applications of vehicle-mounted system 1200. In some embodiments, other components 1214 may include a passenger restraint system, motorized seat adjusters, an automatic HVAC system, and other vehicle components that may desirably be adjusted by vehicle-mounted system 1200 based on the presence and attributes of occupants as described above. In some embodiments, other components 1214 may include an ambient temperature sensor (e.g., a thermocouple, a thermometer), an occupant weight sensor, and other sensors that may provide reference data points for calibrating or verifying the various thermal image analytics described herein.

In various embodiments, one or more components of vehicle-mounted system 1200 may be combined and/or implemented or not, as desired or depending on application requirements. For example, processor 1204 may be combined with infrared imaging module 1202, memory 1206, and/or communication module 1210. In another example, processor 1204 may be combined with infrared imaging sensor 1202 with only certain operations of processor 1204 performed by circuitry (e.g., processor, logic device, microprocessor, microcontroller, etc.) within infrared imaging module 1202.

Thus, vehicle-mounted system 1200 may be mounted on, installed in, or otherwise integrated into a vehicle to provide comprehensive monitoring of occupants. By capturing, processing, and analyzing thermal images of interior compartments, vehicle-mounted system 1200 may determine various attributes of occupants and/or environmental conditions of the interior compartments. Such comprehensive monitoring information may be beneficially used in a variety of situations including, but not limited to, detecting intruders or other unwanted occupants while a vehicle is locked and parked, providing detailed occupant status information in an event of an accident, warning inattentive drivers while a vehicle is being driven, and adjusting various vehicle components. In contrast, conventional sensors cannot provide such comprehensive monitoring of occupants, even when various types of sensors (e.g., occupant weight sensors, transducer-type sensors, motion sensors, seat position sensors, temperature sensors, and other sensors found in a vehicle interior compartment) are used in combination.

Figure 13A:
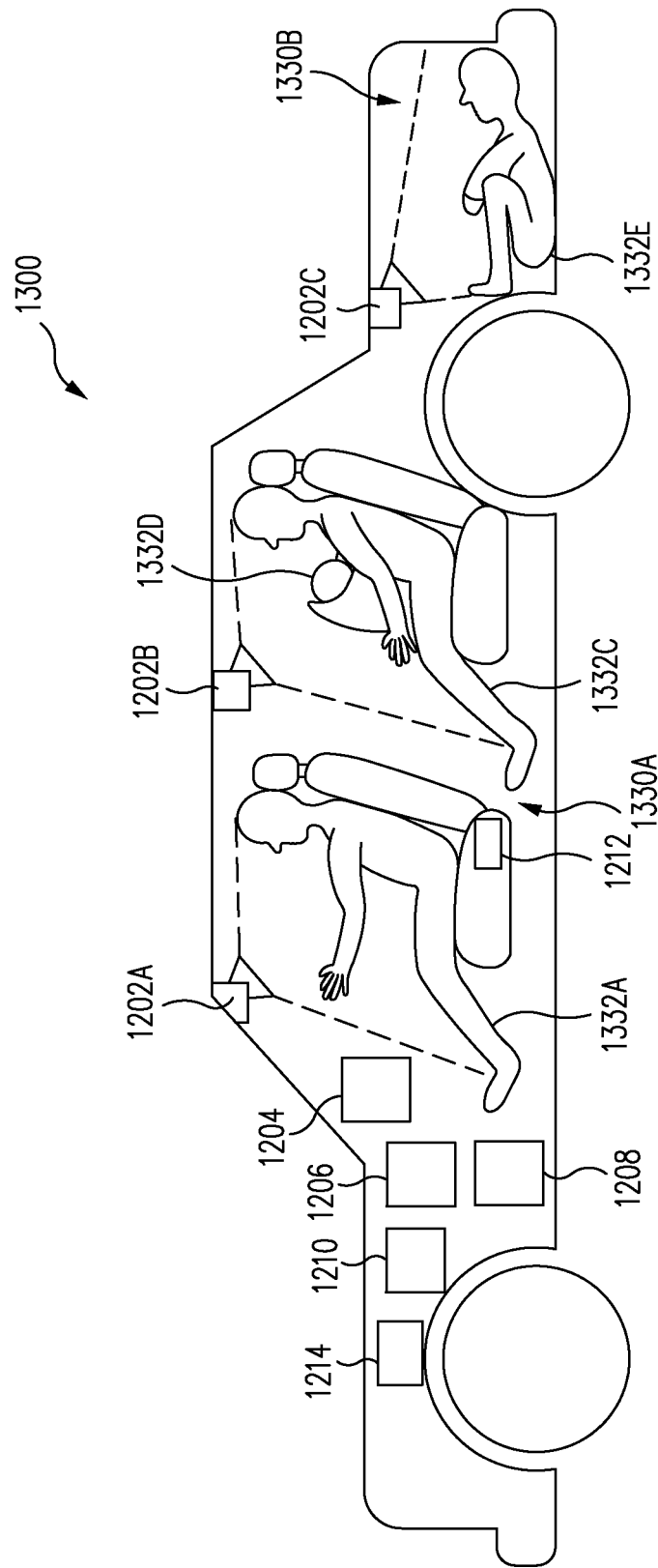
FIGS. 13A-13B illustrate various views of a vehicle having a vehicle-mounted system for monitoring occupants in an interior compartment in accordance with an embodiment of the disclosure.
Figure 13B:
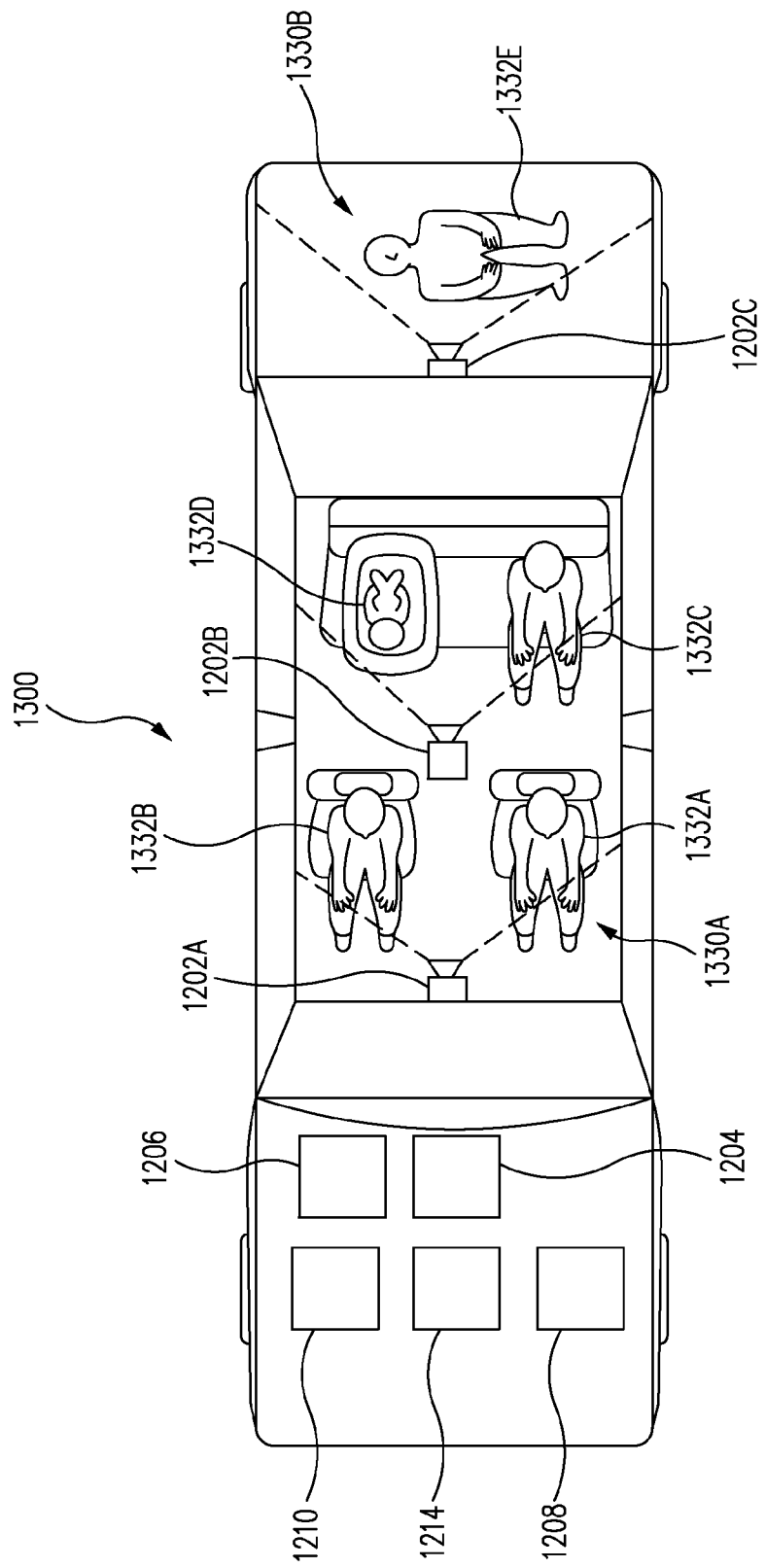

FIGS. 13A-13B show a vehicle 1300 having vehicle-mounted system 1200 for monitoring occupants 1332A-1332E in interior compartments 1330A-1330B of vehicle 1300 in accordance with an embodiment of the disclosure. More specifically, FIG. 13A illustrates a side view of vehicle 1300, having vehicle-mounted system 1200 monitoring a passenger compartment (interior compartment 1330A) and a trunk (interior compartment 1330B, which may be any enclosed or open cargo area), and FIG. 13B illustrates a top view of vehicle 1300.

In one embodiment, a plurality of infrared imaging modules 1202, shown in FIG. 13A-13B as infrared imaging modules 1202A-1202B, may be disposed at appropriate locations in passenger compartment 1330A so that occupants in each row of seats may be within an FOV of at least one of infrared imaging modules 1202A-1202B. Infrared imaging module 1202C may also be positioned at an appropriate location so that trunk 1330B is within its FOV, as shown in FIG. 13A-13B. Placement of infrared imaging module 1203C for monitoring trunk 1330B allows detection of unwanted occupant 1332E (e.g., intruders or trapped persons and animals) that may be present in trunk 1330B.

In other embodiments, more or less infrared imaging modules 1202 may be mounted in interior compartments 1330A-1330B as appropriate for various applications of vehicle-mounted system 1200. For example, four infrared imaging modules 1202 may be utilized and each positioned to cover each one of occupants 1332A-1332D rather than each row of seats. In another embodiment, one infrared imaging module 1202 may be positioned to cover multiple rows of seats within its FOV, for example, when appropriate mounting locations that permit a wide overhead view of interior compartment 1330A are available.

It should be appreciated that although infrared imaging modules 1202A-1202B are shown in FIG. 13A-13B as being mounted on a ceiling of passenger compartment 1330A, infrared imaging modules 1202 may be mounted on or at any other location (e.g., pillar, dashboard, seatback, floor) to capture desired portions of interior compartment 1330A. Moreover, although vehicle 1300 is depicted as an automobile, vehicle-mounted system 1200 may be mounted on, installed in, or otherwise integrated into various other types of vehicles, such as an autobus, a cargo truck, a train, an airliner, or any other vehicle having one or more interior compartments that may be monitored by vehicle-mounted system 1200.

It should also be appreciated that compared with conventional sensors (e.g., pressure/weight sensors integrated into seats, visible light imaging sensors such as CCD or CMOS sensors, or other transducers mounted in interior compartments), utilizing infrared imaging modules 1202 (e.g., an arrangement of infrared imaging modules 1202A-1202C as shown in FIG. 13A-13B) permits more accurate detection of occupants while permitting a smaller number of sensor modules to be mounted.

For example, thermal images captured by just one infrared imaging module (e.g., infrared imaging module 1202B) may contain images of thermal radiation from any number of occupants within its FOV, including an infant (e.g., occupant 1332D) in an infant car seat. As further described herein, radiometric information contained in such thermal images may facilitate detection of presence and attributes (e.g., approximate position, size, and body temperature) of any number of objects having certain radiometric properties. Thus, for example, processor 1202 may be able to detect the presence and attributes of both occupant 1332C and infant 1332D (e.g., detected as a smaller "blob" but still having a surface temperature of a person) from thermal images captured by infrared imaging module 1202B. In contrast, conventional sensors (e.g., weight/pressure sensors, ultrasonic sensors and other similar transducers), even when mounted at multiple locations, may fail to detect infants or other occupants that do not exceed certain size/weight thresholds, and conversely may falsely indicate presence of an occupant when large objects (e.g., luggage) are present.

Figure 14:
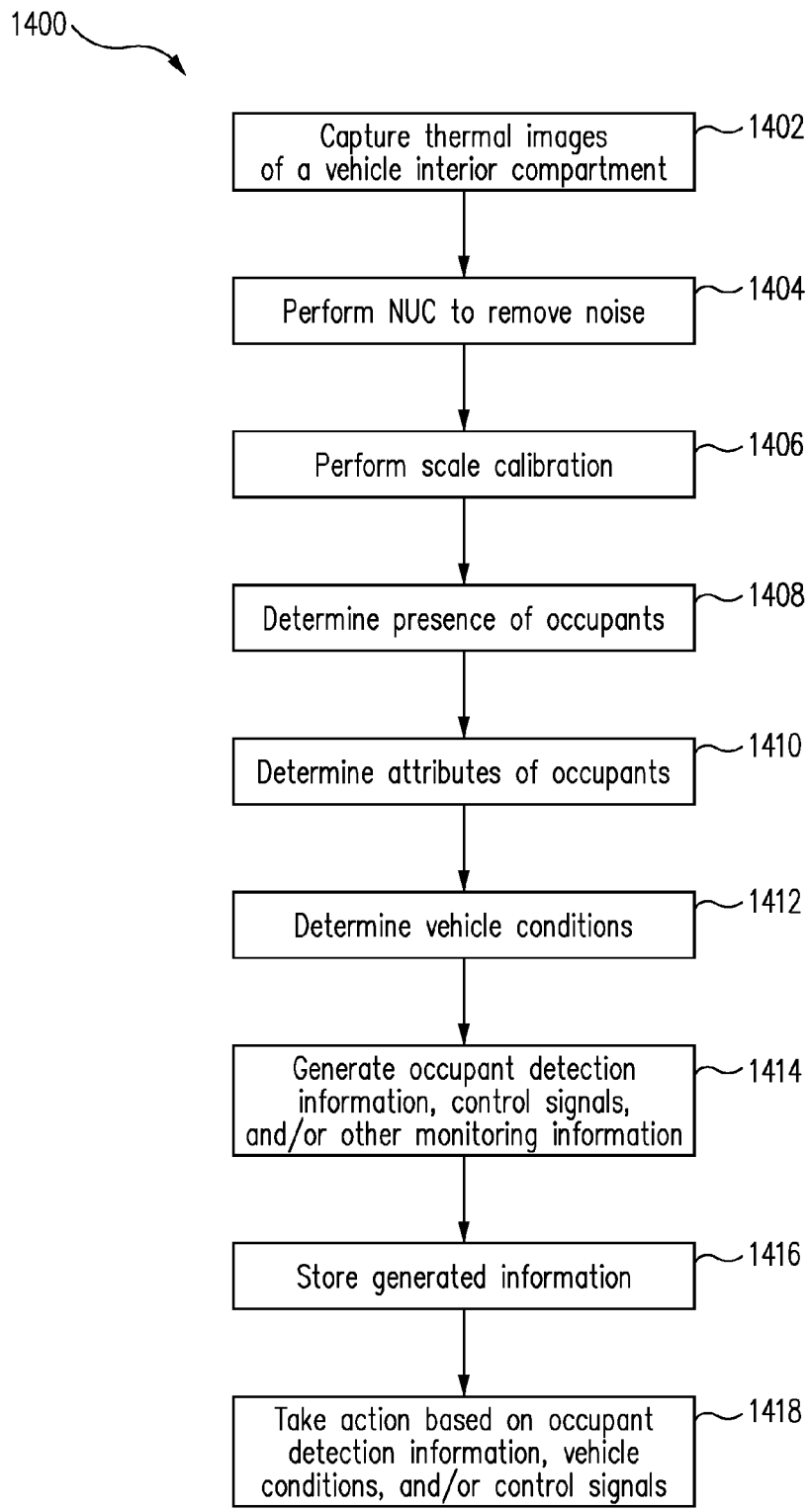
FIG. 14 illustrates a process for monitoring occupants in an interior compartment of a vehicle in accordance with an embodiment of the disclosure.

Referring now to FIG. 14, a flowchart is illustrated of a process 1400 for monitoring occupants in an interior compartment of a vehicle in accordance with an embodiment of the disclosure. For example, process 1400 may be performed by vehicle-mounted system 1200 mounted on or in vehicle 1300. It should be appreciated that vehicle-mounted system 1200 and vehicle 1300 are identified only for purposes of giving examples and that any other suitable system may be mounted on any other suitable vehicle to perform all or part of process 1400.

At block 1402, thermal images (e.g., containing pixels with radiometric data) of desired portions of a vehicle interior compartment may be captured by one or more infrared imaging modules 1202 mounted in or on a vehicle. For example, thermal images containing images of thermal radiation from occupants 1332A-1332E, if present, may be captured by infrared imaging modules 1202A-1202C, as shown in FIGS. 13A-13B. The thermal images may be received, for example, at processor 1204 that is communicatively coupled to one or more infrared imaging modules 1202 via wired or wireless links. At block 1404, an NUC process may be performed on the captured thermal images to remove noise therein, for example, by using various NUC techniques disclosed herein.

In one embodiment, scale calibration may be performed at block 1406, for example, by processor 1204 and/or infrared imaging module 1202 based on the fore-and-aft position, angle, and/or height of an adjustable seat (e.g., seat 1234) as detected by seat position sensors 1212. Some operations of process 1400 may rely on scaling information (e.g., correspondence between the size within thermal images to the actual size) in determining the presence, size, and/or position of occupants. Because the size and/or position of a seated occupant within the captured thermal images may vary depending on the seat position, scale calibration may appropriately adjust such scaling information so that various operations of process 1400 may determine the presence and various attributes of occupants with greater accuracy.

In other embodiments, scale calibration may be performed before block 1402 or block 1404 rather than at block 1406. Also, as will be appreciated, scale calibration may sometimes be performed only when the seat position has changed. In various embodiments, scale calibration may be omitted from process 1400. For example, if the error due to scaling is negligible or if the seat position is fixed, scale calibration may be omitted without affecting other operations of process 1400.

At block 1408, the presence of one or more occupants may be determined from the thermal images. For example, in one embodiment, regions of contiguous pixels having temperature values approximately in the range of a surface temperature of a clothed person may be detected from the radiometrically calibrated thermal images. Such regions (or "blobs") may indicate occupants in the portion of the interior compartment represented by the thermal images. The thermal images and the blobs detected therein may be further processed and/or analyzed, for example, by performing various filtering operations and comparing the size and shape of the blobs to those of a human figure, to ascertain whether one or more occupants are present.

In another embodiment, the thermal images may be analyzed to detect one or more objects, for example, using background modeling techniques, edge detection techniques, or other object detection techniques suitable for use with thermal images. The radiometric properties (e.g., surface temperature) of the detected objects may then be analyzed using radiometric data contained in the thermal images for further determining whether the objects correspond to human occupants. For example, the approximate temperatures of the detected objects may be determined from the thermal images and compared against a temperature range of a clothed person. If a surface temperature of a detected object corresponds to that of a clothed person, the object more likely represent a human occupant. The size and shape of the object may also be analyzed. Based on the size, the shape, and the radiometric properties, it may be ascertained whether the object is a human occupant or not.

In one aspect of such an embodiment, background modeling techniques may be used to detect objects in a vehicle interior compartment. Because the background scene (e.g., an empty passenger compartment) of an interior compartment rarely changes and because thermal images are generally insensitive to changing lighting conditions, a background model (e.g., pixels that belong to a background scene) may be constructed with high accuracy, and a region of pixels different from the background (also referred to as a "region of interest") may easily be distinguished as a probable foreground object. As described above, the radiometric properties of such a region of interest (ROI) may then be analyzed to further ascertain whether the detected ROI likely represent a human occupant or not.

In various embodiments, the various processing and analysis operations described for block 1408 may be omitted or included, and may be performed in any other order as appropriate for determining presence of occupants in an interior compartment of a vehicle. For example, in some embodiments, detecting hot "blobs" may be sufficient to determine presence of occupants, whereas in other embodiments various thermal image analytics may be performed in combination to increase accuracy of detection.

If one or more occupants are detected at block 1408, various attributes associated with the detected occupants may be determined at block 1410. Taking into account which portions of the vehicle interior compartment (e.g., predetermined depending on the mounting location of infrared imaging modules 1202) are represented in the thermal images and based on coordinates of the detected occupants within the thermal images, positions of the one or more occupants may be determined. For example, an occupant may be detected as present on a driver's seat by analyzing thermal images of front row seats of the interior compartment. In another example, a passenger may be detected as present at a certain distance from the door in the rear passenger seat.

The approximate locations of the head, the face, and/or the hands of the detected occupants may be further localized. Because faces or hands are generally exposed (i.e., not covered by clothing), the approximate locations of such parts of the occupants' bodies may be determined by locating the areas with temperatures close to that of an exposed skin area. In some embodiments, the approximate location of the eyes may also be determined. The eyes, whether open or closed, exhibit a higher temperature than the rest of the facial area. Also, if glasses are worn over the eye area, they exhibit much a lower temperature than the rest of the facial area in the thermal images because glasses do not generally transmit thermal radiation. The location of the eyes may be determined by localizing such temperature variations in the facial area. In some embodiments, the approximate body temperatures of the detected occupants may also be determined from the exposed skin areas of the occupants.

The approximate sizes of the detect occupants may also be determined. In one embodiment, the approximate sizes of the occupants may be determined using scaling information and/or proportionality information. As described above with respect to block 1406, scaling information relates to the correspondence between the size within thermal images to the actual size, and may be calibrated if desired. Proportionality information may indicate the correspondence between the portion of occupant's body contained within the thermal image to the estimated full size of the occupant. For example, if due to the mounting location of infrared imaging modules the thermal images contain thermal radiation of only the upper body of an occupant, proportionality information may be used estimate the whole body size. Proportionality information may also be used to correct for the distorted aspect ratio in an overhead perspective view of occupants. Scaling information and/or proportionality information may not be needed, however, if only a rough estimation of sizes are desired. In other embodiments, rough size estimate may be obtained from the pixel count of the detected occupants in thermal images.

At block 1412, various conditions associated with the interior compartment and/or the vehicle may be determined. In one embodiment, the ambient temperature of the interior compartment may be determined from the thermal images. For example, the ambient temperature may be determined by obtaining the surface temperature of a target object of known emissivity. The target object may be placed at a location in the interior compartment such that the thermal radiation from the target object may be imaged at predetermined coordinates in the thermal images. The target object may be an object placed in the interior compartment for the purpose of obtaining an ambient temperature, or it may be any preexisting object or part of a preexisting object (e.g., a particular area of a headliner). In another embodiment, a conventional temperature sensor may be used to determine the ambient temperature in place of, or in addition to, the ambient temperature detection operation using the thermal images.

Other vehicle conditions that may be determined at block 1412 include, but not limited to, whether or not a vehicle collision has occurred, whether the vehicle is moving above a certain speed, and whether or not the vehicle is locked and parked. In one embodiment, conventional motion/shock sensors (e.g., collision sensors coupled to an airbag system) may be polled to detect an occurrence of a vehicle collision. If, for example, it is determined that a vehicle collision has occurred, vehicle-mounted system 1200 may transmit occupant-related information to remote monitoring stations and other external devices so as to aid emergency responders in the rescue effort, as further described herein. In one embodiment, whether or not the vehicle is locked and parked may be determined by polling a vehicle lock mechanism and/or a vehicle security system of the vehicle. If, for example, it is determined that the vehicle is locked and parked, vehicle-mounted system 1200 may monitor the interior compartment for intruders or other unwanted occupants. In one embodiment, whether or not the vehicle is being driven above a certain speed may be determined by polling a vehicle speed sensor. If, for example, it is determined that the vehicle is moving above a certain threshold speed, vehicle-mounted system 1200 may track a driver's face and/or hands to detect an inattentive driver, as further described herein. The threshold speed may be chosen to be any speed at which inattentive driving may pose a danger.

At block 1414, occupant detection information, control signals for adjusting various components, and/or other monitoring information may be generated based on the determination of the presence of the one or more occupants, the attributes associated with the detected occupants, and/or the vehicle conditions. In one embodiment, the occupant detection information may include an indication of whether or not one or more occupants are detected, a count of the detected occupants, and various occupant attributes described above in connection with block 1410. Similarly, control signals to adjust various components (e.g., a passenger restraint system, a HVAC system, and motorized seat adjusters) may be generated based on the determination of the presence of the one or more occupants, the attributes associated with the detected occupants, and/or the vehicle conditions.

In one embodiment, user-viewable thermal images (e.g., thermograms) may be generated by converting the thermal images using appropriate methods and algorithms. For example, the thermal data (e.g., temperature data) contained in the pixels of the thermal images may be converted into gray-scaled or color-scaled pixels to construct images that can be viewed by a person. User-viewable thermal images may optionally include a legend or scale that indicates the approximate temperature of corresponding pixel color and/or intensity. Such user-viewable images of the interior compartment may be transmitted to and viewed by an owner of the vehicle and/or other appropriate persons for a better understanding of the occupant detection information, for example, when an unwanted occupant may be present or when a vehicle collision has occurred. Other monitoring information may also be generated as further described herein.

At block 1416, various types of information and data generated in process 1400 may be stored in a memory (e.g., memory 1206). The stored information may be recalled and retrieved, for example, to review detected intrusions or to transmit to emergency responder services in an event of an accident.

At block 1418, various actions may be taken in response to, or based on, the occupant detection information, the detected vehicle conditions, and/or the control signals. For example, in various embodiments, various vehicle components and subsystems including, but not limited to, a passenger restraint system, a HVAC system, an on-board entertainment system, and motorized seat, steering column and pedal adjusters may be adjusted in response to or based on the generated control signals, as described above in connection with processor 1204 of FIG. 12. Also in various embodiments, various alarms may be generated based on the occupant detection information and/or the vehicle condition, as described further herein.

Figure 15:
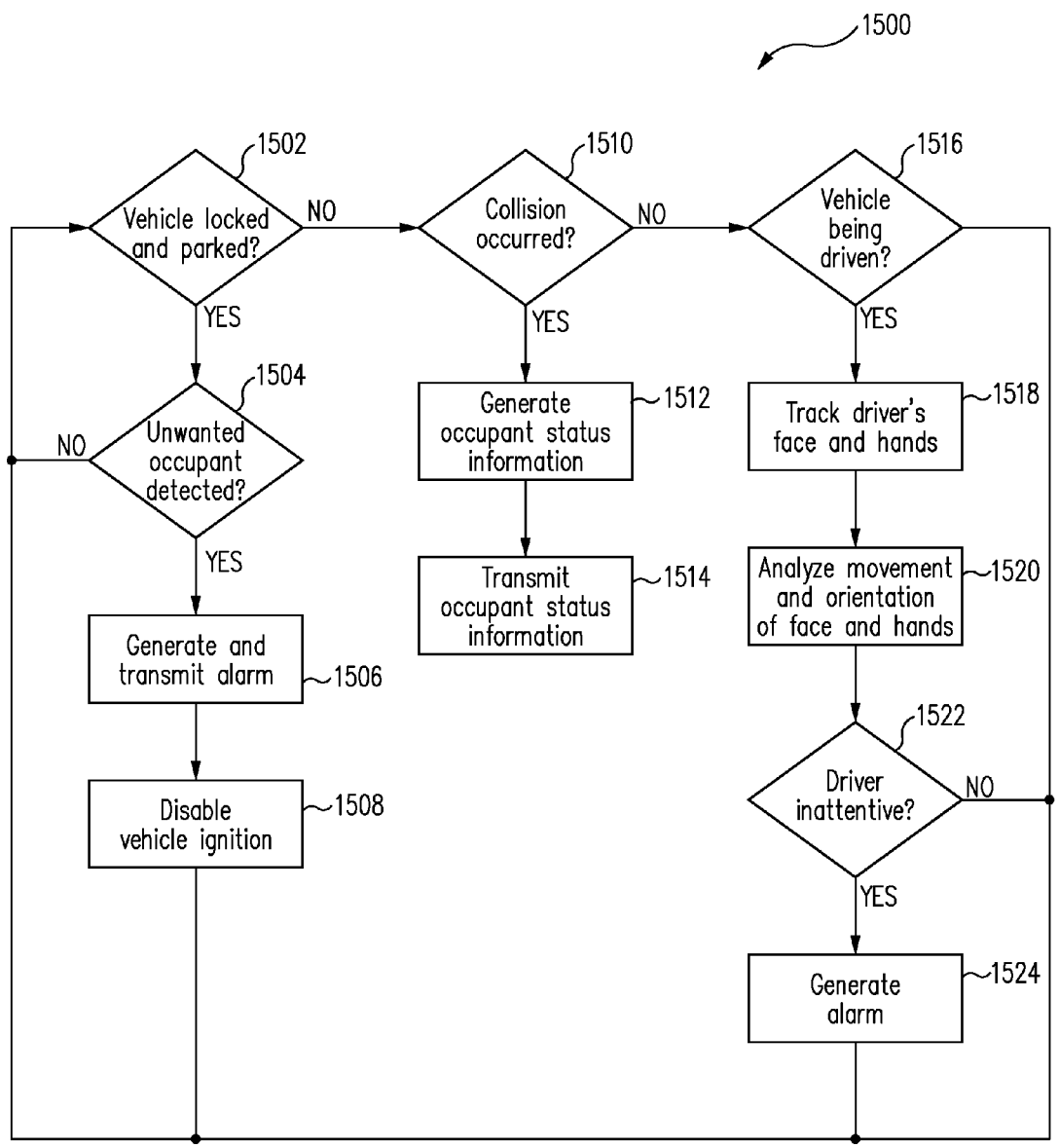
FIG. 15 illustrates a process for performing various monitoring operations based on occupant detection information in accordance with an embodiment of the disclosure.

FIG. 15 illustrates a process 1500 for performing various monitoring operations based on occupant detection information in accordance with an embodiment of the disclosure. For example, process 1500 may be performed as part of process 1400 of FIG. 14, such as at block 1414 (e.g., generate various types of information) and/or at block 1418 (e.g., take action based on generated information).

At block 1502, the vehicle condition from process 1400 may be queried to check whether the vehicle is locked and parked. If so, the occupant detection information from process 1400 may be queried at block 1504 to check whether one or more occupants are detected in the vehicle interior compartment. If one or more occupants are detected, an alarm may be generated at block 1506 to warn of unwanted occupants in the vehicle interior compartment. The generated alarm may be transmitted to a key fob, a remote monitoring station, or other external devices such as a mobile phone, so that an owner of the vehicle and/or other appropriate persons may be warned. Also, alarm sirens (e.g., alarm sirens 1208) may be used to sound sirens and flash lights. At block 1508, the vehicle ignition may be disabled to prevent a possible vehicle theft. It will be appreciated that intruder detection based on the occupant detection information permits detection of unscrupulous intruders who may not be detected under conventional shock/motion based security system sensors, since such intruders may stay still lurking inside the vehicle after gaining entrance to the vehicle. By staying still, an intruder may avoid triggering conventional sensors, but may not avoid being detected by systems and methods described herein due to the heat signature given off by the intruder.

If it is determined at block 1502 that the vehicle is not parked but being driven, the vehicle condition may be further queried at block 1510 to check whether a collision has occurred or not. If so, occupant status information may be generated at block 1512. In one embodiment, the occupant status information may be generated based on various current and stored information generated through process 1400, including the position and the count of the occupants, user-viewable thermal images of the vehicle interior compartment, and the approximate body temperatures of the occupants. In some embodiments, the health conditions of the occupants may be determined by further analyzing the approximate body temperatures of the occupants and the thermal images. The health conditions may then be included in the occupant status information. For example, the occupant status information may indicate that an occupant is in critical condition if the body temperature is below a normal range, and/or it may indicate that an occupant is bleeding if the clothed area of an occupant's body exhibits patches of high body temperature.

At block 1514, the generated occupant status information may be transmitted, for example, to a remote monitoring station for vehicle telematics and accident notification systems (e.g., OnStar™, Ford Sync 911™, BMW Assist™, and other similar systems) in an event of a collision to aid emergency responders in their rescue effort. The occupant status information may be transmitted to other external devices, such as a mobile phone or a networked computer.

If it is determined at block 1510 that the vehicle is not involved in a collision, the vehicle condition may be further queried at block 1516 to check whether the vehicle is being driven above a threshold speed. If so, the driver's face and/or hands may be tracked based on the occupant detection information at block 1518. As described above with respect to block 1410 of FIG. 14, the location of the driver's face, eyes, and hands may be determined by analyzing the thermal images and the radiometric data contained therein. The orientation and movement of the driver's face and hands may be tracked using the location information. At block 1520, the tracked orientation and movement of the driver's face and/or hands may be analyzed to determine whether the driver is inattentive or not. For example, the driver may be inattentive if the hands are not on the steering wheel for a certain duration and/or if the eyes are not directed to the road ahead for a certain duration. If it is determine that the driver may be inattentive at block 1522, an alarm may be generated at block 1524 to warn the driver to focus on driving.

Therefore, it will be appreciated that process 1400 may generate comprehensive occupant detection information by capturing, processing, and analyzing thermal images and the radiometric data contained therein. Such comprehensive occupant detection information may be advantageously used by operations of process 1500 to provide monitoring of an interior compartment of a vehicle and occupants therein for a variety of situations.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A vehicle comprising:
   an interior compartment;
   an adjustable component responsive to a control signal;
   an infrared imaging device comprising a focal plane array (FPA) and configured to capture thermal images comprising pixels representing thermal radiation variations in at least a portion of the interior compartment; and
   a processor configured to:
   analyze the thermal radiation variations represented in the pixels of the thermal images;
   detect one or more regions-of-interest (ROIs) in the thermal images based on the analysis of the thermal radiation variations;
   analyze geometric and thermal properties of the one or more detected ROIs;
   determine, based on the analysis of the geometric and thermal properties of the detected ROIs, a count of one or more occupants present in the portion of the interior compartment and approximate sizes and/or positions of the one or more occupants, and
   generate the control signal based on the determination of the count and the approximate sizes and/or the positions of the one or more occupants.

2. The vehicle of claim 1, wherein:
   the adjustable component is an airbag assembly configured to deploy one or more airbags according to one or more deployment parameters; and
   the control signal is configured to adjust the deployment parameters including whether to enable or disable airbag deployment.

3. The vehicle of claim 2, wherein the one or more deployment parameters determine timing and/or intensity of airbag deployment based at least in part on the positions and/or the sizes of the one or more occupants.

4. The vehicle of claim 1, wherein the adjustable component is a motorized adjuster configured to adjust a position of at least one of a seat, a steering column, or a pedal in response to the control signal.

5. The vehicle of claim 1, wherein:
the adjustable component is a heating, ventilation, and air conditioning (HVAC) system configured to control a climate of the interior compartment according to climate settings; and
the control signal is configured to adjust the climate settings of the HVAC system based at least in part on the count and the positions of the one or more occupants present in the portion of the interior compartment.

6. The vehicle of claim 1, wherein:
the thermal images are unblurred thermal images of the at least a portion of the interior compartment;
the infrared imaging device is configured to capture intentionally blurred thermal images of the at least a portion of the interior compartment; and
the processor is configured to determine a plurality of non-uniformity correction (NUC) terms based on the intentionally blurred thermal images and apply the NUC terms to the unblurred thermal images to remove noise form the unblurred thermal images.

7. The vehicle of claim 1, wherein the processor is configured to determine the count and the approximate sizes and/or the positions of the one or more occupants using the thermal images and without input from additional sensors.

8. The vehicle of claim 1, wherein:
the processor is configured to analyze the thermal radiation variations represented in the pixels of the thermal images at least by comparing the thermal radiation variations against a surface temperature range of a person;
the geometric property of the detected ROIs being analyzed comprises a shape and/or a size of the detected ROIs; and
the thermal property of the detected ROIs being analyzed comprises a surface temperature of the detected ROIs.

9. The vehicle of claim 1, wherein:
the thermal images are radiometrically normalized thermal images such that the pixels represent calibrated temperature data; and
the infrared imaging device comprises a shutter used as a temperature reference in a periodic calibration process for radiometric normalization of the thermal images.

10. A method comprising:
capturing, using a focal plane array (FPA) of an infrared imaging device, thermal images comprising pixels representing thermal radiation variations in at least a portion of an interior compartment of a vehicle, wherein the infrared imaging device is mounted in or on the vehicle so that the at least a portion of the interior compartment is within a field of view (FOV) of the infrared imaging device;
analyzing the thermal radiation variations represented in the pixels of the thermal images;
detecting one or more regions-of-interest (ROIs) in the thermal images based on the analysis of the thermal radiation variations;
analyzing geometric and thermal properties of the one or more detected ROIs;
determining, by a processor based on the analysis of the geometric and thermal properties of the detected ROIs, a count of one or more occupants present in the portion of the interior compartment and approximate sizes and/or positions of the one or more occupants;
generating, by the processor, a control signal for an adjustable component of the vehicle based on the determination of the count and the approximate sizes and/or the positions of the one or more occupants; and
providing the control signal to the adjustable component.

11. The method of claim 10, wherein:
the adjustable component is an airbag assembly configured to deploy one or more airbags according to one or more deployment parameters; and
the generating comprises configuring the control signal to adjust the deployment parameters including whether to enable or disable airbag deployment.

12. The method of claim 11, wherein the one or more deployment parameters determine timing and/or intensity of airbag deployment based at least in part on the positions and/or the sizes of the one or more occupants.

13. The method of claim 10, wherein:
the adjustable component is a seatbelt tensioner configured to provide appropriate tension to a seatbelt according to one or more parameters; and
the generating comprises configuring the control signal to adjust the parameters.

14. The method of claim 10, wherein:
the adjustable component is a heating, ventilation, and air conditioning (HVAC) system configured to control a climate of the interior compartment according to climate settings; and
the generating of the control signal comprises configuring the control signal to adjust the climate settings of the HVAC system based at least in part on the count and the positions of the one or more occupants present in the portion of the interior compartment.

15. The method of claim 10, further comprising transmitting wirelessly the thermal images captured by the infrared imaging device to the processor.

16. The method of claim 10, wherein the thermal images are unblurred thermal images, the method further comprising:
capturing intentionally blurred thermal images of the at least a portion of the interior compartment;
determining a plurality of non-uniformity correction (NUC) terms based on the intentionally blurred thermal images; and
applying the NUC terms to the unblurred thermal images to remove noise from the unblurred thermal images.

17. The method of claim 10, wherein the determining of the count and the approximate sizes and/or the positions of the one or more occupants is performed using the thermal images and without input from additional sensors.

18. The method of claim 10, wherein:
the analyzing of the thermal radiation variations represented in the pixels of the thermal images comprises comparing the thermal radiation variations against a surface temperature range of a person;
the geometric property of the detected ROIs being analyzed comprises a shape and/or a size of the detected ROIs; and
the thermal property of the detected ROIs being analyzed comprises a surface temperature of the detected ROIs.

19. The method of claim 10, wherein:
the thermal images are radiometrically normalized thermal images such that the pixels represent calibrated temperature data; and
the method further comprises periodically and automatically calibrating the infrared imaging device for radiometric normalization of the thermal images.

20. A vehicle-mountable infrared camera system comprising:

an infrared imaging device configured to be mounted in an interior compartment of a vehicle, the infrared imaging device comprising a focal plane array (FPA) and configured to capture thermal images comprising thermal radiation variations in a portion of the interior compartment within a field of view (FOV);

a processor configured to:
- analyze the thermal radiation variations represented in pixels of the thermal images;
- detect one or more regions-of-interest (ROIs) in the thermal images based on the analysis of the thermal radiation variations;
- analyze geometric and thermal properties of the one or more detected ROIs;
- determine, based on the analysis of the geometric and thermal properties, a count of one or more occupants present in the portion of the interior compartment and approximate sizes and/or positions of the one or more occupants; and
- generate a control signal for an adjustable component of the vehicle based on the determination of the count and the approximate sizes and/or the positions of the one or more occupants; and a network interface controller (NIC) configured to manage wired and/or wireless communications with the adjustable component of the vehicle, wherein the processor is further configured to transmit the control signal to the adjustable component via the NIC.

\* \* \* \* \*